US012763624B2

(12) United States Patent
Sun et al.

(10) Patent No.: US 12,763,624 B2
(45) Date of Patent: Oct. 13, 2026

(54) STATOR CORE, MOTOR, COMPRESSOR, AND VEHICLE

(71) Applicants: ANHUI WELLING AUTO PARTS CO., LTD., Hefei (CN); GUANGDONG WELLING AUTO PARTS CO., LTD., Foshan (CN)

(72) Inventors: Guowei Sun, Hefei (CN); Zhifu Lu, Hefei (CN)

(73) Assignees: ANHUI WELLING AUTO PARTS CO., LTD., Hefei (CN); GUANGDONG WELLING AUTO PARTS CO., LTD., Foshan (CN)

( * ) Notice: Subject to any disclaimer, the term of this patent is extended or adjusted under 35 U.S.C. 154(b) by 161 days.

(21) Appl. No.: 18/237,063

(22) Filed: Aug. 23, 2023

(65) Prior Publication Data

US 2023/0402891 A1 Dec. 14, 2023

Related U.S. Application Data

(63) Continuation of application No. PCT/CN2022/087925, filed on Apr. 20, 2022.

(30) Foreign Application Priority Data

May 17, 2021 (CN) ........................ 202110536079.X
May 17, 2021 (CN) ........................ 202121051684.X

(51) Int. Cl.
*H02K 3/32* (2006.01)
*F25B 31/02* (2006.01)
*H02K 1/14* (2006.01)

(52) U.S. Cl.
CPC ............ *H02K 3/325* (2013.01); *F25B 31/02* (2013.01); *H02K 1/148* (2013.01)

(58) Field of Classification Search
CPC .......... H02K 1/12; H02K 1/148; H02K 29/03; H02K 2213/03
See application file for complete search history.

(56) References Cited

U.S. PATENT DOCUMENTS 5,986,377 A 11/1999 Yamada et al.
7,667,367 B2 * 2/2010 Matsuo .................. H02K 1/148 310/216.008

(Continued)

FOREIGN PATENT DOCUMENTS

CN 103427508 A 12/2013
CN 103715786 A 4/2014

(Continued)

OTHER PUBLICATIONS

Notice of Reasons for Refusal dated Jun. 4, 2024 received in Japanese Patent Application No. JP 2023-541353.

(Continued)

*Primary Examiner* — Christopher M Koehler
*Assistant Examiner* — Riley Owen Stout
(74) *Attorney, Agent, or Firm* — K&L Gates LLP

(57) ABSTRACT

A stator core, an electric motor, a compressor and a vehicle are provided. The stator core has multiple block cores. The block cores are sequentially connected end to end around an axis of the stator core. Each block core has multiple stacked laminations. Each block core has a stator yoke and a stator tooth, which are connected to each other. The stator tooth is located between the stator yoke and the axis of the stator core. The stator yokes and the stator teeth of any two adjacent block cores define a stator slot. A wall surface, facing the axis of the stator core, of the stator yoke is a spliced surface. In a circumferential direction of the stator core, at least part of a joint of any two adjacent spliced surfaces is in smooth transition.

18 Claims, 9 Drawing Sheets

(56) References Cited

U.S. PATENT DOCUMENTS

| | | | | | |
|---|---|---|---|---|---|
| 2005/0212377 | A1* | 9/2005 | Wang | H02K 3/522 310/260 | |
| 2019/0190326 | A1* | 6/2019 | Nakahara | H02K 1/16 | |

FOREIGN PATENT DOCUMENTS

| | | | |
|---|---|---|---|
| CN | 208423962 | U | 1/2019 |
| CN | 112119569 | A | 12/2020 |
| CN | 212909123 | U | 4/2021 |
| CN | 113300501 | A | 8/2021 |
| CN | 215835208 | U | 2/2022 |
| DE | 102011078513 | A1 | 1/2013 |
| EP | 2713479 | A2 | 4/2014 |
| JP | H07222383 | A | 8/1995 |
| JP | H07255158 | A | 10/1995 |
| JP | H10201146 | A | 7/1998 |
| JP | H11346447 | A | 12/1999 |
| JP | 2000341913 | A | 12/2000 |
| JP | 2002136003 | A | 5/2002 |
| JP | 3461552 | B2 | 10/2003 |
| KR | 20150074955 | A | 7/2015 |
| WO | 2020238160 | A1 | 12/2020 |

OTHER PUBLICATIONS

First Office Action dated Mar. 22, 2025 for Chinese Patent Application No. 202110536079.X.

Supplementary European Search Report dated Jul. 9, 2024 received in European Patent Application No. EP 22803727.1.

International Search Report dated Jun. 15, 2022 issued in PCT/CN2022/087925.

Decision of Refusal dated Nov. 19, 2024 received in Japanese patent Application No. 2023-541353.

The second office action of EP Application No. 22803727.1, dated Jun. 6, 2026.

* cited by examiner

STATOR CORE, MOTOR, COMPRESSOR, AND VEHICLE

CROSS-REFERENCE TO RELATED APPLICATIONS

This application is a continuation application of PCT International Patent Application No. PCT/CN2022/087925, filed on Apr. 20, 2022, which claims priority to Chinese Patent Application No. 202110536079.X filed with China National Intellectual Property Administration on May 17, 2021 and entitled "Stator core, electric motor, compressor, and vehicle", and Chinese Patent Application No. 202121051684.X filed with China National Intellectual Property Administration on May 17, 2021 and entitled "Stator core, electric motor, compressor, and vehicle", the entire contents of each of which are incorporated by reference for all purposes. No new matter has been introduced.

FIELD

The present disclosure relates to the field of electric motors, and particularly relates to a stator core, an electric motor, a compressor, and a vehicle.

BACKGROUND

At present, as shown in FIGS. 14-17, a stator core 100' includes a plurality of block cores 110'. Each block core 110' includes a plurality of laminations 120' stacked. A wall surface, facing an axis of the stator core 100', of a stator yoke of the block core 110' is an oblique surface.

In the related art, a joint 130' of two adjacent stator yokes forms a sharp angle. In this way, a size of the joint of the two adjacent stator yokes in a radial direction of the stator core 100' is reduced, which affects performance of an electric motor, interferes with a winding reel and further affects a winding effect.

SUMMARY

The present disclosure aims to solve at least one of the problems in the prior art or related art.

In view of that, a first aspect of the present disclosure provides a stator core.

A second aspect of the present disclosure provides an electric motor.

A third aspect of the present disclosure provides a compressor.

A fourth aspect of the present disclosure provides a vehicle.

In view of that, the first aspect of the present disclosure provides a stator core. The stator core includes: a plurality of block cores. The plurality of block cores are sequentially connected end to end along an axis of the stator core, and each of the block cores includes a plurality of laminations stacked. Each of the block cores includes a stator yoke and a stator tooth that are connected to each other, the stator tooth is located between the stator yoke and the axis of the stator core, and the stator yokes and the stator teeth of any two adjacent block cores define a stator slot. A wall surface, facing the axis of the stator core, of the stator yoke is a spliced surface. Along a circumferential direction of the stator core, there is a smooth transition in at least part of a joint of any two adjacent spliced surfaces.

The stator core provided in the present disclosure includes the plurality of block cores, and the plurality of block cores are sequentially connected end to end along the axis of the stator core, to constitute a cylindrical structure.

Each of the block cores includes the stator yoke and the stator tooth that are connected to each other, and the stator yokes and the stator teeth of any two adjacent block cores define the stator slot. The wall surface, facing the axis of the stator core, of the stator yoke is the spliced surface.

In the related art, a wall surface, facing the axis of the stator core, of the block core is an oblique surface. In this way, a joint of two adjacent stator yokes forms a sharp angle, and a size of the joint of the two adjacent stator yokes in a radial direction of the stator core is reduced, which affects the performance of the electric motor.

According to the present disclosure, a structure of the block cores is reasonably arranged, and there is a smooth transition in at least part of the joint of spliced surfaces of any two adjacent stator yokes along the circumferential direction of the stator core. Through the arrangement, a size of the joint of the two adjacent stator yokes is increased advantageously in the radial direction of the stator core, the situation that performance of the electric motor is affected due to too small a size of the joint of the two adjacent stator yokes is avoided, and running stability and working efficiency of the electric motor can be ensured.

Further, along the circumferential direction of the stator core, there is a smooth transition in at least part of the joint of the spliced surfaces of any two adjacent stator yokes. In this way, the situation that burrs are generated at the joint of the two adjacent stator yokes due to machining errors and assembly errors and are likely to puncture slot insulation paper in the stator core can be avoided, an insulation effect of the slot insulation paper can be ensured, and stable and reliable structural support is provided for ensuring performance of the electric motor. The structure has advantages of a simple machining technology, convenient operation and low production cost.

Further, along the circumferential direction of the stator core, there is a smooth transition in at least part of the joint of the spliced surfaces of any two adjacent stator yokes. When a winding reel is used for winding, the joint of the two adjacent stator yokes cannot interfere with the winding reel, and the winding reel may be attached to a slot bottom of the stator slot. Further, a matching size of a winding and the stator core after winding is ensured, and effective structural support is provided for stability and efficiency of running of the electric motor.

The stator core according to the present disclosure may further include the following additional features.

In the above embodiment, further, at least part of the spliced surface is a curved surface, and there is a smooth transition in the spliced surfaces of the two adjacent stator yokes by the curved surfaces.

In the embodiment, a matching portion of the two adjacent block cores is recorded as a fracture, each of the block cores has the spliced surface, and at least part of the spliced surface is the curved surface. When the two adjacent stator yokes are spliced, curved surfaces on two sides of the fracture are connected in a matched manner, and there is a smooth transition in the spliced surfaces of the two adjacent stator yokes by the curved surfaces. In this way, burrs or tips at the joint of the two adjacent stator yokes can be effectively avoided.

In any one of the above embodiments, further, the curved surface is an arc surface; and the stator core is sectioned in a direction perpendicular to an axial direction of the stator core, and a radius corresponding to an outline of the arc surface in a section is smaller than a thickness of a lamination.

In the embodiment, the structure of the block cores is reasonably arranged, the spliced surface of the block core is the arc surface, and a relation between a size of the arc surface and the thickness of the lamination is defined, and the stator core is sectioned in the direction perpendicular to the axial direction of the stator core, and the radius corresponding to the outline of the arc surface in the section is smaller than the thickness of the lamination. In this way, when the winding reel is used for winding, no interference in the winding reel is generated, and the winding reel may be attached to the slot bottom of the stator slot. Further, the matching size of the winding and the stator core after winding is ensured, and it is ensured that the matching size of the winding and the stator core provides effective structural support for stability and efficiency of running of the electric motor.

If the radius corresponding to the outline of the arc surface is greater than the thickness of the lamination, interference in the winding reel may be generated, and the winding reel cannot extend into the slot bottom of the stator slot. In this way, the winding effect can be affected, and the matching size of the winding and the stator core cannot be ensured.

It may be understood that the thickness of the lamination refers to a size of the lamination in the axial direction of the stator core.

In any one of the above embodiments, further, the block core includes: a sunken portion, and a main portion. The sunken portion and the main portion are stacked in the axial direction of the stator core, and there is a smooth transition in a joint of the spliced surfaces corresponding to any two adjacent main portions along the circumferential direction of the stator core. The stator core is sectioned in the direction perpendicular to the axial direction of the stator core, and the stator slot corresponding to the sunken portion has a greater sectional area than the stator slot corresponding to the main portion.

In the embodiment, the matching structure of the block cores is reasonably arranged, and the block core includes the sunken portion and the main portion that are stacked.

The stator core is sectioned in the direction perpendicular to the axial direction of the stator core, and the stator slot corresponding to the sunken portion has a greater sectional area than the stator slot corresponding to the main portion. That is, the slot wall of the stator slot corresponding to the sunken portion and the main portion define a recess. That is, at least part of the slot wall of the stator slot corresponding to the sunken portion and the slot wall of the stator slot corresponding to the main portion constitute a stepped structure.

In some embodiments, the stator includes the stator core and an insulation support. When the stator core is connected to the insulation support in a matched manner, the insulation support is provided with an insulation protrusion. The insulation protrusion abuts against an interior of the recess. The insulation protrusion is capable of wrapping an edge of the sunken portion. In this way, on the basis of ensuring performance of the electric motor, a height of the stator in the axial direction of the stator core can be reduced, and a ratio of occupying an internal space of the electric motor by the stator is reduced advantageously, and further a size of the electric motor and a weight of the electric motor are reduced advantageously.

In addition, through the arrangement, a length of each winding can be reduced, the number of windings can be reduced, and production cost of products can be reduced.

In addition, along the circumferential direction of the stator core, there is a smooth transition in the joint of the spliced surfaces corresponding to any two adjacent main portions. Through the arrangement, a size of the joint of the stator yokes corresponding to the two adjacent main portions is increased advantageously in the radial direction of the stator core, and running stability and working efficiency of the electric motor can be ensured.

Further, along the circumferential direction of the stator core, there is a smooth transition in the joint of the spliced surfaces corresponding to any two adjacent main portions. In this way, the situation that burrs are generated at the joint of the stator yokes corresponding to the two adjacent main portions due to machining errors and assembly errors and are likely to puncture the slot insulation paper in the stator core can be avoided, an insulation effect of the slot insulation paper can be ensured, and stable and reliable structural support is provided for ensuring performance of the electric motor. The structure has advantages of a simple machining technology, convenient operation and low production cost.

Further, along the circumferential direction of the stator core, there is a smooth transition in the joint of the spliced surfaces corresponding to any two adjacent main portions. When the winding reel is used for winding, no interference in the winding reel is generated, and the winding reel may be attached to the slot bottom of the stator slot. Further, a matching size of the winding and the stator core after winding is ensured, and effective structural support is provided for stability and efficiency of running of the electric motor.

In any one of the above embodiments, further, a slot wall of the stator slot corresponding to the sunken portion is located on an outer side of a slot wall of the stator slot corresponding to the main portion.

In the embodiment, the slot wall of the stator slot corresponding to the sunken portion is located on the outer side of the slot wall of the stator slot corresponding to the main portion. That is, the recess defined between the slot wall of the stator slot corresponding to the sunken portion and the main portion is provided around the stator slot corresponding to the main portion. Through the arrangement, a matching area and a matching angle between the insulation support and the stator core is increased advantageously, and stability and reliability of matching between the insulation support and the stator core is improved advantageously.

In any one of the above embodiments, further, the number of the sunken portions is two, and the two sunken portions are stacked on two sides of the main portion, respectively.

In the embodiment, the number of the sunken portions is two. A matching structure of the two sunken portions and the main portion is reasonably arranged, and one of the two sunken portions is located on one side of the main portion, and the other one of the two sunken portions is located on the other side of the main portion. That is, the two sunken portions are stacked on the two sides of the main portion, respectively.

When the stator core is connected to the insulation support in a matched manner, the insulation protrusion on the insulation support is capable of wrapping the two sides of the stator core. In this way, on the basis of ensuring performance of the electric motor, a height of the stator in the axial direction of the stator core can be reduced, and a ratio of occupying an internal space of the electric motor by the stator is reduced advantageously, and further a size of the electric motor and a weight of the electric motor are reduced advantageously.

In addition, as a thickness of an end of the insulation support decreases, an axial length of the winding wound around the block core may further decrease, and the number of windings is reduced, and production cost of products is reduced advantageously.

In any one of the above embodiments, further, a first center line of a slot opening of the stator slot corresponding to the sunken portion is located on one side of a second center line of the stator slot corresponding to the sunken portion; and a third center line of a slot opening of the stator slot corresponding to the main portion is located on one side of a fourth center line of the stator slot corresponding to the main portion.

In the embodiment, a center line of the slot opening of the stator slot corresponding to the sunken portion is recorded as the first center line, a center line of the stator slot corresponding to the sunken portion is recorded as the second center line, and the first center line is located on one side of the second center line. In this way, reluctance torque caused by asymmetry of a rotor magnetic circuit structure is fully used, and when the electric motor works, a rotor inside the stator core rotates to improve the reluctance torque of the electric motor, and torque and a torque coefficient of the electric motor are improved without changing a back electromotive force coefficient, and it is ensured that the electric motor has great torque output capability during rotation.

A center line of the slot opening of the stator slot corresponding to the main portion is recorded as the third center line, a center line of the stator slot corresponding to the main portion is recorded as the fourth center line, and the third center line is located on one side of the fourth center line. In this way, reluctance torque caused by asymmetry of a rotor magnetic circuit structure is fully used, and when the electric motor works, a rotor inside the stator core rotates to improve the reluctance torque of the electric motor, and torque and a torque coefficient of the electric motor are improved without changing a back electromotive force coefficient, and it is ensured that the electric motor has great torque output capability during rotation. The electric motor is a unidirectional rotating motor.

In any one of the above embodiments, further, the first center line is parallel to the second center line; and the third center line is parallel to the fourth center line.

In the embodiment, the first center line is parallel to the second center line, that is, the first center line and the second center line are parallel to each other and do not coincide with each other. The third center line is parallel to the fourth center line, that is, the third center line and the fourth center line are parallel to each other and do not coincide with each other.

In some embodiments, the block core is sectioned in the direction perpendicular to the axial direction of the stator core. In the section, a connecting line between the joint of the spliced surfaces of the two adjacent stator yokes and a center of the stator core is a center line of the stator slot.

In any one of the above embodiments, further, the first center line is located on one side of the third center line; and in the circumferential direction of the stator core, the slot opening of the stator slot corresponding to the sunken portion has a greater width than the slot opening of the stator slot corresponding to the main portion.

In the embodiment, a structure of the stator core is reasonably arranged, and the first center line is located on one side of the third center line; and in the circumferential direction of the stator core, the slot opening of the stator slot corresponding to the sunken portion has a greater width than the slot opening of the stator slot corresponding to the main portion. Through the arrangement, the torque and the torque coefficient of the electric motor can be improved, it can be ensured that the electric motor has great torque output capability during rotation, and further machining difficulty of the stator core can be reduced. The stator core is convenient to machine and can be produced massively, and production cost of products can be reduced.

In any one of the above embodiments, further, the stator tooth includes: a tooth body connected to the stator yoke; and a tooth crown connected to one end, facing away from the stator yoke, of the tooth body. The tooth crown includes a first pole shoe and a second pole shoe. The first pole shoe and the second pole shoe are located on two sides of the tooth body in the circumferential direction of the stator core. An end surface, facing away from the tooth body, of the first pole shoe corresponding to the sunken portion is coplanar with an end surface, facing away from the tooth body, of the first pole shoe corresponding to the main portion. An end surface, facing away from the tooth body, of the second pole shoe corresponding to the sunken portion is located on an inner side of an end surface, facing away from the tooth body, of the second pole shoe corresponding to the main portion.

In the embodiment, the stator tooth includes the tooth body and the tooth crown. The tooth crown includes the first pole shoe and the second pole shoe. The first pole shoe and the second pole shoe are located on the two sides of the tooth body in the circumferential direction of the stator core. That is, the slot opening of the stator slot is defined between the first pole shoes and the second pole shoes of the two adjacent block cores.

The end surface, facing away from the tooth body, of the first pole shoe corresponding to the sunken portion is coplanar with the end surface, facing away from the tooth body, of the first pole shoe corresponding to the main portion. The end surface, facing away from the tooth body, of the second pole shoe corresponding to the sunken portion is located on the inner side of the end surface, facing away from the tooth body, of the second pole shoe corresponding to the main portion. Through the arrangement, it is feasible to machine the stator core, machining difficulty of the stator core can be reduced, the stator core is convenient to machine and can be produced massively, and production cost of products can be reduced.

In some embodiments, in the circumferential direction of the stator core, the corresponding center line of a part between the first pole shoes and the second pole shoes of the two adjacent block cores is the center line of the slot opening of the stator slot.

In some embodiments, in the direction perpendicular to the axis of the stator core, a projection of the end surface, facing away from the tooth body, of the first pole shoe corresponding to the sunken portion on a predetermined plane coincides with a projection of the end surface, facing away from the tooth body, of the first pole shoe corresponding to the main portion on the predetermined plane. The predetermined plane is perpendicular to the axis of the stator core.

In any one of the above embodiments, further, the plurality of laminations of each of the block cores include: a plurality of first lamination layers and a plurality of second lamination layers. In the axial direction of the stator core, a second lamination layer is sandwiched between any two adjacent first lamination layers, the first lamination layer includes at least one first lamination, and the second lamination layer includes at least one second lamination. In the circumferential direction of the stator core, first sides of the first lamination layers are provided with overlapping portions, and second sides of the first lamination layers are provided with notch portions. In the circumferential direction of the stator core, first sides of the second lamination layers are provided with notch portions, and second sides of the second lamination layers are provided with overlapping portions. In the axial direction of the stator core, the two adjacent overlapping portions are located on two sides of the notch portion and define an overlapping gap. When the two adjacent block cores are connected in a matched manner, the overlapping portion of one of the block cores may be inserted into the overlapping gap of the other block core, and a height of a part, first inserted into the overlapping gap in a circle forming process, of the overlapping portion is smaller than a distance between the overlapping gaps.

In the embodiment, the block core includes the plurality of first lamination layers and the plurality of second lamination layers, and a second lamination layer is sandwiched between any two adjacent first lamination layers. The first lamination layer has a fracture, and the first lamination layer is provided with the overlapping portion on a first side of the fracture and the notch portion on a second side of the fracture. The second lamination layer has a fracture, and the second lamination layer is provided with the notch portion on a first side of the fracture and the overlapping portion on a second side of the fracture.

In this way, when the plurality of first lamination layers and the second lamination layers are distributed alternately in the axial direction of the stator core, an interval exists between the overlapping portions of the two adjacent first lamination layers at the first side of the fracture, and the overlapping gap of the first side of the fracture is directly defined at the notch portion of the second lamination layer between the two first lamination layers. Accordingly, an interval exists between the overlapping portions of the two adjacent second lamination layers at the second side of the fracture, and the overlapping gap of the first side of the fracture is directly defined at the notch portion of the first lamination layer between the two second lamination layers.

It may be understood that the stator core is provided with a fracture, and the stator core may be disconnected or formed into a circle at the fracture. In some embodiments, when the stator core is in a disconnected state, the winding may be wound around the stator tooth. In this case, the stator core is in the disconnected state, and it is ensured that the stator slot has a large enough space, which facilitates winding of the winding and further facilitates corresponding insulation treatment. After winding, the stator core may be spliced and formed into a circle.

Especially, when the stator core is in the disconnected state, the stator core is provided with the overlapping gap on the first side of the fracture in the circumferential direction, and the stator core is provided with the overlapping portion on the second side of the fracture in the circumferential direction. When the two adjacent block cores are connected in a matched manner, the overlapping portion of one of the block cores may be inserted into the overlapping gap of the other block core. That is, when the stator core is to be spliced and formed into a circle, the overlapping portion may be inserted into the overlapping gap, and further splicing and circle forming of the stator core are completed.

In addition, in a splicing and circle forming process, an end of the overlapping portion is first inserted into the overlapping gap. Therefore, the overlapping portion is optimized, and the height of the part, first inserted into the overlapping gap in the circle forming process, of the overlapping portion is designed to be smaller than the distance between the overlapping gaps. In this way, in the splicing and circle forming process, it is ensured that the end of the overlapping portion can be successfully inserted into the overlapping gap first and no interference and collision occur in a process of inserting the overlapping portion. Even by optimizing the height of the end of the overlapping portion, a tolerance of the overlapping portion and the overlapping gap and burrs and other defects generated in a process of manufacturing the overlapping portion can be compensated for, working efficiency of splicing and circle forming is ensured, and further quality of the stator core finally manufactured is ensured.

Therefore, the stator provided in the present disclosure optimizes the height of the end of the overlapping portion, and the height of the part, first inserted into the overlapping gap in the circle forming process, of the overlapping portion is smaller than the distance between the overlapping gaps, and it is ensured that the end of the overlapping portion can be successfully inserted into the overlapping gap in the splicing and circle forming process, and further the problem that splicing is conducted unsuccessfully due to defects such as manufacturing errors or burrs in the related art is solved.

In any one of the above embodiments, further, in the axial direction of the stator core, projections of end surfaces, facing away from the notch portions, of the overlapping portions of the plurality of second lamination layers on a first plane coincide with one another. In the axial direction of the stator core, projections of end surfaces, facing away from the notch portions, of the overlapping portions of the plurality of first lamination layers on the first plane coincide with one another. The first plane is a plane perpendicular to the axis of the stator core.

In the embodiment, in the axial direction of the stator core, the projections of the end surfaces, facing away from the notch portions, of the overlapping portions of the plurality of second lamination layers on the first plane coincide with one another, and the projections of the end surfaces, facing away from the notch portions, of the overlapping portions of the plurality of first lamination layers on the first plane coincide with one another. Through the arrangement, after the stator core is formed into a circle, in the axial direction of the stator core, projections of the fractures of the plurality of first lamination layers on the first plane coincide with projections of the fractures of the plurality of second lamination layers on the first plane. Through the arrangement, machining is facilitated, mass production is feasible, and production cost of products is reduced under the condition of ensuring performance of the stator core.

In any one of the above embodiments, further, in the axial direction of the stator core, projections of end points, facing the axis of the stator core, of the overlapping portions of the plurality of second lamination layers on a second plane coincide with one another. In the axial direction of the stator core, projections of end points, facing the axis of the stator core, of the overlapping portions of the plurality of first lamination layers on the second plane coincide with one another. The second plane is a plane perpendicular to the axis of the stator core.

In the embodiment, in the axial direction of the stator core, the projections of the end points, facing the axis of the stator core, of the overlapping portions of the plurality of second lamination layers on the second plane coincide with one another, and the projections of the end points, facing the axis of the stator core, of the overlapping portions of the plurality of first lamination layers on the second plane coincide with one another. After the stator core is formed into a circle, in the axial direction of the stator core, projections of end points, facing the stator core, of the fractures of the plurality of first lamination layers on the second plane coincide with projections of end points, facing the stator core, of the fractures of the plurality of second lamination layers on the second plane. Through the arrangement, along the circumferential direction of the stator core, there is a smooth transition in the joint of the spliced surfaces of any two adjacent stator yokes is, which provides stable and reliable structural support.

In any one of the above embodiments, further, the overlapping portion includes: an insertion portion inserted into the overlapping gap; and a guide portion arranged on the insertion portion and inserted first into the overlapping gap in the circle forming process. The guide portion has a smaller height than the insertion portion.

In the embodiment, the overlapping portion includes the insertion portion and the guide portion. The guide portion is arranged on the insertion portion and inserted first into the overlapping gap in the circle forming process. Therefore, the present disclosure optimizes the height of the guide portion and ensures that the guide portion has a smaller height than the insertion portion, and the overlapping portion can be optimized to be a structure having thinner edges and a thicker middle portion, it is ensured that the guide portion can play a good guiding role in the splicing and circle forming process, and it is ensured that the guide portion and the insertion portion can be successfully inserted into the overlapping gap.

In addition, the height of the guide portion is designed to be smaller than the distance between the overlapping gaps, and the height of the insertion portion is designed to match the distance between the overlapping gaps, and on one hand, it is ensured that the guide portion can be successfully inserted into the overlapping gap, and on the other hand, it is ensured that the insertion portion is in contact with an inner wall of the overlapping gap after splicing and circle forming, to ensure friction between the insertion portion and the overlapping gap and further facilitate subsequent welding treatment. In one embodiment, an inner diameter and an outer diameter of the stator core are ensured to be accurate after splicing and circle forming, and a circular degree of the inner diameter and the outer diameter of the stator core is ensured to be accurate, and iron loss of the electric motor using the stator is greatly reduced, and performance of the stator and the electric motor is improved.

A second aspect of the present disclosure provides an electric motor. The electric motor includes the stator core according to any one of the embodiments in the first aspect.

The electric motor provided in the present disclosure includes the stator core according to any one of the embodiments in the first aspect, so the electric motor has all the beneficial effects of the above stator core, which will not be described in details herein.

A third aspect of the present disclosure provides a compressor. The compressor includes the electric motor according to the second aspect.

The compressor provided in the present disclosure includes the electric motor according to the second aspect, so the compressor has all the beneficial effects of the above electric motor, which will not be described in details herein.

A fourth aspect of the present disclosure provides a vehicle. The vehicle includes the compressor according to the third aspect.

The vehicle provided in the present disclosure includes the compressor according to the third aspect, so the vehicle has all the beneficial effects of the above compressor, which will not be described in details herein.

Additional aspects and advantages of the present disclosure will become obvious in the following description, or can be learned by practice of the present disclosure.

BRIEF DESCRIPTION OF THE DRAWINGS

What is described above and/or additional aspects and advantages of the present disclosure will become obvious and comprehensible from the following description of embodiments in conjunction with the accompanying drawings.

Figure 1:
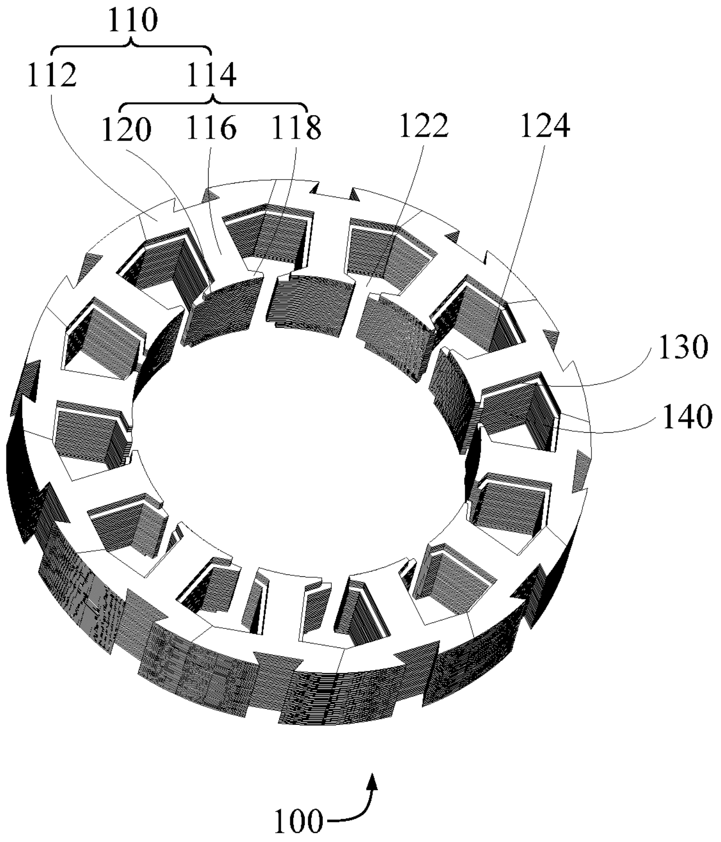
FIG. 1 shows a schematic structural diagram from a first viewing angle of a stator core according to an embodiment of the present disclosure.

In the figures, a corresponding relation between reference numbers in FIGS. 1-13 and component names is as follows:

100 stator core, 110 block core, 112 stator yoke, 114 stator tooth, 116 tooth body, 118 first pole shoe, 120 second pole shoe, 122 stator slot, 124 spliced surface, 130 sunken portion, 140 main portion, 150 first center line, 160 second center line, 170 third center line, 180 fourth center line, 190 first lamination layer, 200 second lamination layer, 210 overlapping portion, 220 notch portion, 230 overlapping gap, 232 insertion portion, 234 guide portion.

A corresponding relation between reference numbers in FIGS. 14-17 and component names is as follows:

100' stator core, 110' block core, 120' lamination, 130' joint.

DETAILED DESCRIPTION OF THE DISCLOSURE

To make the above objectives, features, and advantages of the present disclosure more obvious and comprehensible, the present disclosure will be described in detail below with reference to accompanying drawings and embodiments. It should be noted that embodiments in the present disclosure and features in the embodiments can be combined with one another if there is no conflict.

Many details are set forth in the following description to facilitate full understanding of the present disclosure, but the present disclosure can further be implemented in other ways different from those described herein, and therefore, the protection scope of the present disclosure is not limited by the embodiments disclosed below.

With reference to FIGS. 1-13, a stator core 100, an electric motor, a compressor and a vehicle according to some embodiments of the present disclosure will be described below.

As shown in FIGS. 1, 2, 3, 4, 5, 8, 11 and 12, an embodiment of the first aspect of the present disclosure provides a stator core 100. The stator core 100 includes a plurality of block cores 110. The plurality of block cores 110 are sequentially connected end to end along an axis of the stator core 100, and each of the block cores 110 includes a plurality of laminations stacked.

Each of the block cores 110 includes a stator yoke 112 and a stator tooth 114 that are connected to each other. The stator tooth 114 is located between the stator yoke 112 and the axis of the stator core 100. The stator yokes 112 and the stator teeth 114 of any two adjacent block cores 110 define a stator slot 122.

A wall surface, facing the axis of the stator core 100, of the stator yoke 112 is a spliced surface 124. Along a circumferential direction of the stator core 100, there is a smooth transition in at least part of a joint of any two adjacent spliced surfaces 124.

In the embodiment, the stator core 100 includes the plurality of block cores 110, and the plurality of block cores 110 are sequentially connected end to end along the axis of the stator core 100, to constitute a cylindrical structure.

Each of the block cores 110 includes the stator yoke 112 and the stator tooth 114 that are connected to each other, and the stator yokes 112 and the stator teeth 114 of any two adjacent block cores 110 define the stator slot 122. The wall surface, facing the axis of the stator core 100, of the stator yoke 112 is the spliced surface 124.

In the related art, a wall surface, facing an axis of a stator core 100', of a block core 110' is an oblique surface. In this way, a joint of two adjacent stator yokes forms a sharp angle, and a size of the joint of the two adjacent stator yokes in a radial direction of the stator core 100' is reduced, which affects performance of an electric motor.

According to the present disclosure, a structure of the block cores 110 is reasonably arranged, and there is a smooth transition in at least part of the joint of spliced surfaces 124 of any two adjacent stator yokes 112 along the circumferential direction of the stator core 100. Through the arrangement, a size of the joint of the two adjacent stator yokes 112 is increased advantageously in the radial direction of the stator core 100, the situation that performance of the electric motor is affected due to too small a size of the joint of the two adjacent stator yokes 112 is avoided, and running stability and working efficiency of the electric motor can be ensured.

Further, along the circumferential direction of the stator core 100, there is a smooth transition in at least part of the joint of the spliced surfaces 124 of any two adjacent stator yokes 112. In this way, the situation that burrs are generated at the joint of the two adjacent stator yokes 112 due to machining errors and assembly errors and are likely to puncture slot insulation paper in the stator core 100 can be avoided, an insulation effect of the slot insulation paper can be ensured, and stable and reliable structural support is provided for ensuring performance of the electric motor. The structure has advantages of a simple machining technology, convenient operation and low production cost.

Further, along the circumferential direction of the stator core 100, there is a smooth transition in at least part of the joint of the spliced surfaces 124 of any two adjacent stator yokes 112. When a winding reel is used for winding, the joint of the two adjacent stator yokes 112 cannot interfere with the winding reel, and the winding reel may be attached to a slot bottom of the stator slot 122. Further, a matching size of a winding and the stator core 100 after winding is ensured, and effective structural support is provided for stability and efficiency of running of the electric motor.

In this embodiment, along the circumferential direction of the stator core 100, there is a smooth transition in the entire joint of any two adjacent spliced surfaces 124; and alternatively, along the circumferential direction of the stator core 100, there is a smooth transition in the partial joint of any two adjacent spliced surfaces 124.

As shown in FIGS. 1-5, 8, 11 and 12, a stator core 100 is provided according to another embodiment. The stator core 100 includes a plurality of block cores 110. The plurality of block cores 110 are sequentially connected end to end along an axis of the stator core 100, and each of the block cores 110 includes a plurality of laminations stacked.

Each of the block cores 110 includes a stator yoke 112 and a stator tooth 114 that are connected to each other. The stator tooth 114 is located between the stator yoke 112 and the axis of the stator core 100. The stator yokes 112 and the stator teeth 114 of any two adjacent block cores 110 define a stator slot 122.

A wall surface, facing the axis of the stator core 100, of the stator yoke 112 is a spliced surface 124. Along a circumferential direction of the stator core 100, there is a smooth transition in at least part of a joint of spliced surfaces 124 of any two adjacent stator yokes 112.

Further, at least part of the spliced surface 124 is a curved surface, and there is a smooth transition in the spliced surfaces 124 of the two adjacent stator yokes 112 by the curved surfaces.

In this embodiment, a matching portion of the two adjacent block cores 110 is recorded as a fracture, each of the block cores 110 has the spliced surface 124, and at least part of the spliced surface 124 is the curved surface. When the two adjacent stator yokes 112 are spliced, curved surfaces on two sides of the fracture are connected in a matched manner, and there is a smooth transition in the spliced surfaces 124 of the two adjacent stator yokes 112 by the curved surfaces. In this way, burrs or tips at the joint of the two adjacent stator yokes 112 can be effectively avoided.

In this embodiment, in the circumferential direction of the stator core 100, the spliced surfaces 124 of the block cores 110 include an oblique surface and a curved surface.

In some other embodiments, the spliced surface 124 of the block core 110 is the curved surface.

Further, the curved surface is an arc surface. The stator core 100 is sectioned in a direction perpendicular to an axial direction of the stator core 100, and a radius corresponding to an outline of the arc surface in a section is smaller than a thickness of a lamination.

In some embodiments, a structure of the block cores 110 is reasonably arranged, the spliced surface 124 of the block core 110 is the arc surface, and a relation between a size of the arc surface and the thickness of the lamination is defined, and the stator core 100 is sectioned in the direction perpendicular to the axial direction of the stator core 100, and the radius corresponding to the outline of the arc surface in the section is smaller than the thickness of the lamination. In this way, when a winding reel is used for winding, no interference in the winding reel is generated, and the winding reel may be attached to a slot bottom of the stator slot 122. Further, a matching size of the winding and the stator core 100 after winding is ensured, and it is ensured that the matching size of the winding and the stator core 100 provides effective structural support for stability and efficiency of running of an electric motor.

If the radius corresponding to the outline of the arc surface is greater than the thickness of the lamination, interference in the winding reel may be generated, and the winding reel cannot extend into the slot bottom of the stator slot 122. In this way, a winding effect can be affected, and the matching size of the winding and the stator core 100 cannot be ensured.

It may be understood that the thickness of the lamination refers to a size of the lamination in the axial direction of the stator core.

As shown in FIGS. 1-5, 8, 11 and 12, a stator core 100 is provided according to another embodiment. The stator core 100 includes a plurality of block cores 110. The plurality of block cores 110 are sequentially connected end to end along an axis of the stator core 100, and each of the block cores 110 includes a plurality of laminations stacked.

Each of the block cores 110 includes a stator yoke 112 and a stator tooth 114 that are connected to each other. The stator tooth 114 is located between the stator yoke 112 and the axis of the stator core 100. The stator yokes 112 and the stator teeth 114 of any two adjacent block cores 110 define a stator slot 122.

A wall surface, facing the axis of the stator core 100, of the stator yoke 112 is a spliced surface 124. Along a circumferential direction of the stator core 100, there is a smooth transition in at least part of a joint of spliced surfaces 124 of any two adjacent stator yokes 112.

Further, as shown in FIGS. 1, 2, 3, 4, 5, 6, 8, 9, 10, 11 and 13, the block core 110 includes a sunken portion 130 and a main portion 140 that are stacked. The sunken portion 130 and the main portion 140 are stacked in an axial direction of the stator core 100, and there is a smooth transition in a joint of the spliced surfaces corresponding to any two adjacent main portions 140 along the circumferential direction of the stator core 100. The stator core 100 is sectioned in the direction perpendicular to the axial direction of the stator core 100, and the stator slot 122 corresponding to the sunken portion 130 has a greater sectional area than the stator slot 122 corresponding to the main portion 140.

In this embodiment, a matching structure of the block cores 110 is reasonably arranged, and the block core 110 includes the sunken portion 130 and the main portion 140 that are stacked.

The stator core 100 is sectioned in the direction perpendicular to the axial direction of the stator core 100, and the stator slot 122 corresponding to the sunken portion 130 has a greater sectional area than the stator slot 122 corresponding to the main portion 140. That is, a slot wall of the stator slot 122 corresponding to the sunken portion 130 and the main portion 140 define a recess. That is, at least part of the slot wall of the stator slot 122 corresponding to the sunken portion 130 and a slot wall of the stator slot 122 corresponding to the main portion 140 constitute a stepped structure.

In this embodiment, a stator includes the stator core 100 and an insulation support. When the stator core 100 is connected to the insulation support in a matched manner, the insulation support is provided with an insulation protrusion. The insulation protrusion abuts against an interior of the recess. The insulation protrusion is capable of wrapping an edge of the sunken portion 130. In this way, on the basis of ensuring performance of an electric motor, a height of the stator in the axial direction of the stator core 100 can be reduced, and a ratio of occupying an internal space of the electric motor by the stator is reduced advantageously, and further a size of the electric motor and a weight of the electric motor are reduced advantageously.

In addition, through the arrangement, a length of each winding can be reduced, the number of windings can be reduced, and production cost of products can be reduced.

In this embodiment, there is a smooth transition in a joint of spliced surfaces 124 corresponding to any two adjacent main portions 140.

Figure 2:
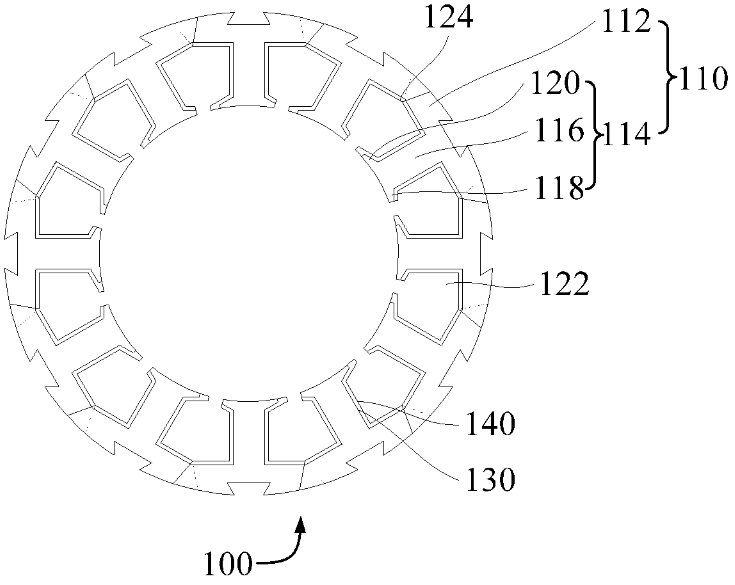
FIG. 2 shows a schematic structural diagram from a second viewing angle of a stator core according to an embodiment of the present disclosure.
Figure 3:
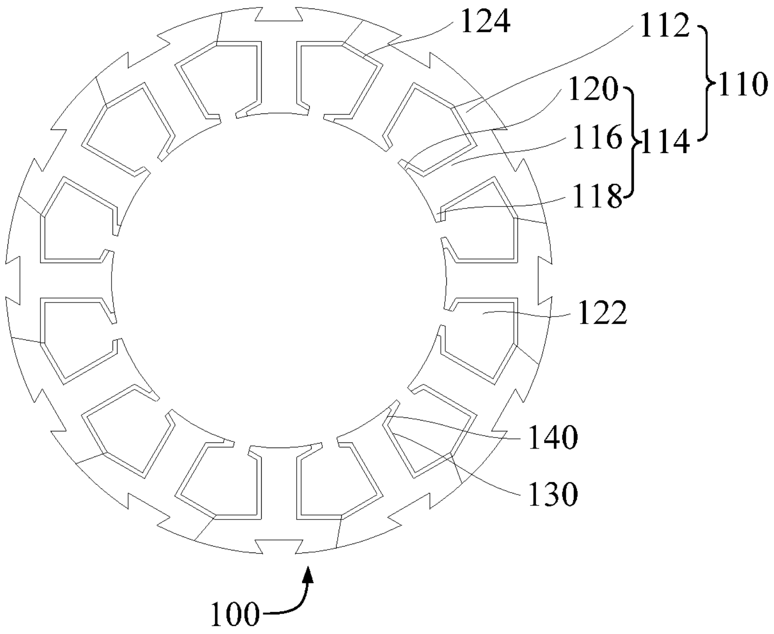
FIG. 3 shows a schematic structural diagram from a third viewing angle of a stator core according to an embodiment of the present disclosure.
Figure 4:
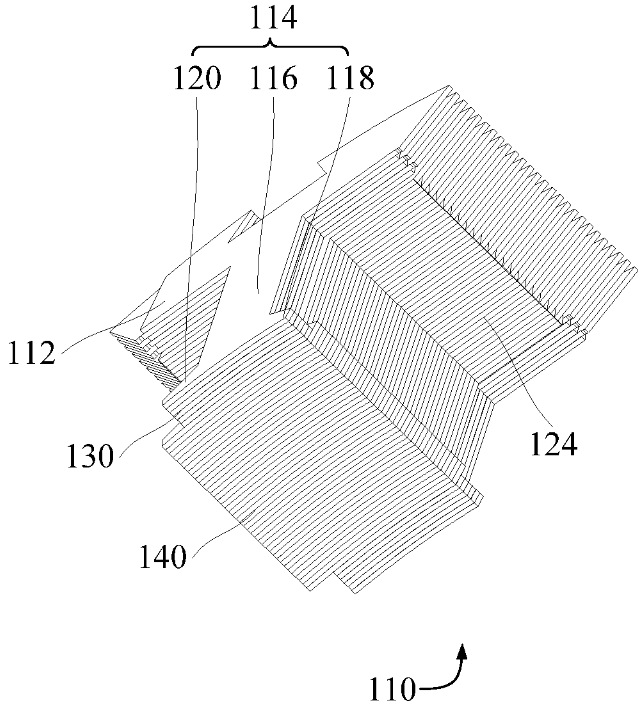
FIG. 4 shows a schematic structural diagram from a first viewing angle of a block core according to an embodiment of the present disclosure.
Figure 5:
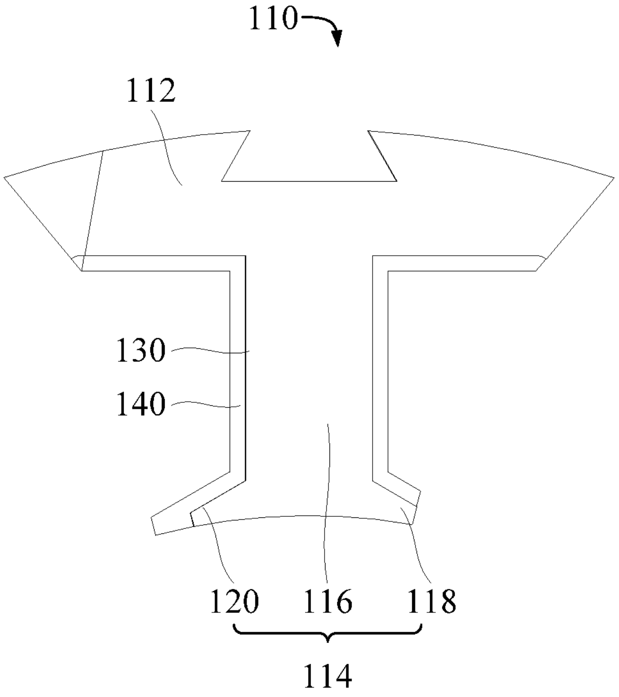
FIG. 5 shows a schematic structural diagram from a second viewing angle of a block core according to an embodiment of the present disclosure.

Further, as shown in FIGS. 1, 2 and 3, the slot wall of the stator slot 122 corresponding to the sunken portion 130 is located on an outer side of the slot wall of the stator slot 122 corresponding to the main portion 140.

The slot wall of the stator slot 122 corresponding to the sunken portion 130 is located on the outer side of the slot wall of the stator slot 122 corresponding to the main portion 140. That is, the recess defined between the slot wall of the stator slot 122 corresponding to the sunken portion 130 and the main portion 140 is provided around the stator slot 122 corresponding to the main portion 140. Through the arrangement, a matching area and a matching angle between the insulation support and the stator core 100 is increased advantageously, and stability and reliability of matching between the insulation support and the stator core 100 is improved advantageously.

As shown in FIGS. 1-5, 8, 11 and 12, a stator core 100 is provided according to another embodiment. The stator core 100 includes a plurality of block cores 110. The plurality of block cores 110 are sequentially connected end to end along an axis of the stator core 100, and each of the block cores 110 includes a plurality of laminations stacked.

Each of the block cores 110 includes a stator yoke 112 and a stator tooth 114 that are connected to each other. The stator tooth 114 is located between the stator yoke 112 and the axis of the stator core 100. The stator yokes 112 and the stator teeth 114 of any two adjacent block cores 110 define a stator slot 122.

A wall surface, facing the axis of the stator core 100, of the stator yoke 112 is a spliced surface 124. Along a circumferential direction of the stator core 100, there is a smooth transition in at least part of a joint of spliced surfaces 124 of any two adjacent stator yokes 112.

The block core 110 includes a sunken portion 130 and a main portion 140 that are stacked. The sunken portion 130 and the main portion 140 are stacked in an axial direction of the stator core 100. The stator core 100 is sectioned in the direction perpendicular to the axial direction of the stator core 100, and the stator slot 122 corresponding to the sunken portion 130 has a greater sectional area than the stator slot 122 corresponding to the main portion 140.

Further, the number of the sunken portions 130 is two, and the two sunken portions 130 are stacked on two sides of the main portion 140, respectively.

In this embodiment, the number of the sunken portions 130 is two. A matching structure of the two sunken portions 130 and the main portion 140 is reasonably arranged, and one of the two sunken portions 130 is located on one side of the main portion 140, and the other one of the two sunken portions 130 is located on the other side of the main portion 140. That is, the two sunken portions 130 are stacked on the two sides of the main portion 140, respectively.

When the stator core 100 is connected to an insulation support in a matched manner, an insulation protrusion on the insulation support is capable of wrapping two sides of the stator core 100. In this way, on the basis of ensuring performance of an electric motor, a height of the stator in the axial direction of the stator core 100 can be reduced, and a ratio of occupying an internal space of the electric motor by the stator is reduced advantageously, and further a size of the electric motor and a weight of the electric motor are reduced advantageously.

In addition, as a thickness of an end of the insulation support decreases, an axial length of the winding wound around the block core 110 may further decrease, and the number of windings is reduced, and production cost of products is reduced advantageously.

As shown in FIGS. 1-5, 8, 11 and 12, a stator core 100 is provided according to another embodiment. The stator core 100 includes a plurality of block cores 110. The plurality of block cores 110 are sequentially connected end to end along an axis of the stator core 100, and each of the block cores 110 includes a plurality of laminations stacked.

Each of the block cores 110 includes a stator yoke 112 and a stator tooth 114 that are connected to each other. The stator tooth 114 is located between the stator yoke 112 and the axis of the stator core 100. The stator yokes 112 and the stator teeth 114 of any two adjacent block cores 110 define a stator slot 122.

A wall surface, facing the axis of the stator core 100, of the stator yoke 112 is a spliced surface 124. Along a circumferential direction of the stator core 100, there is a smooth transition in at least part of a joint of spliced surfaces 124 of any two adjacent stator yokes 112.

The block core 110 includes a sunken portion 130 and a main portion 140 that are stacked. The sunken portion 130 and the main portion 140 are stacked in an axial direction of the stator core 100. The stator core 100 is sectioned in the direction perpendicular to the axial direction of the stator core 100, and the stator slot 122 corresponding to the sunken portion 130 has a greater sectional area than the stator slot 122 corresponding to the main portion 140.

Figure 10:
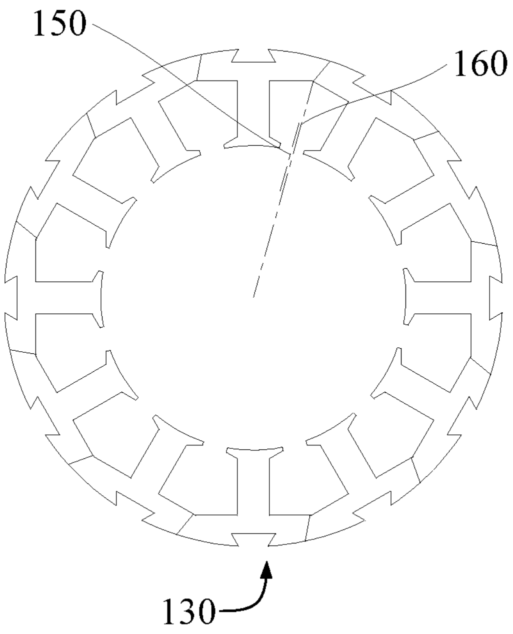
FIG. 10 shows a schematic structural diagram from a second viewing angle of a sunken portion according to an embodiment of the present disclosure.
Figure 11:
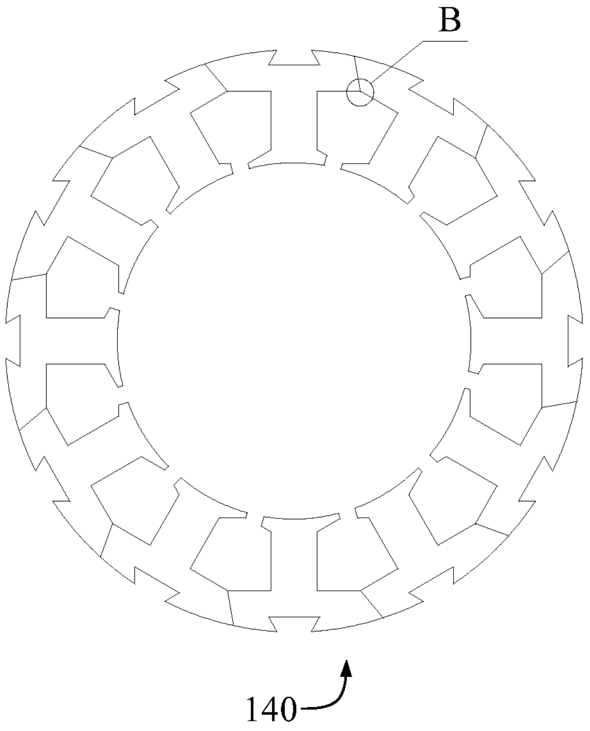
FIG. 11 shows a schematic structural diagram from a first viewing angle of a main portion according to an embodiment of the present disclosure.
Figure 12:
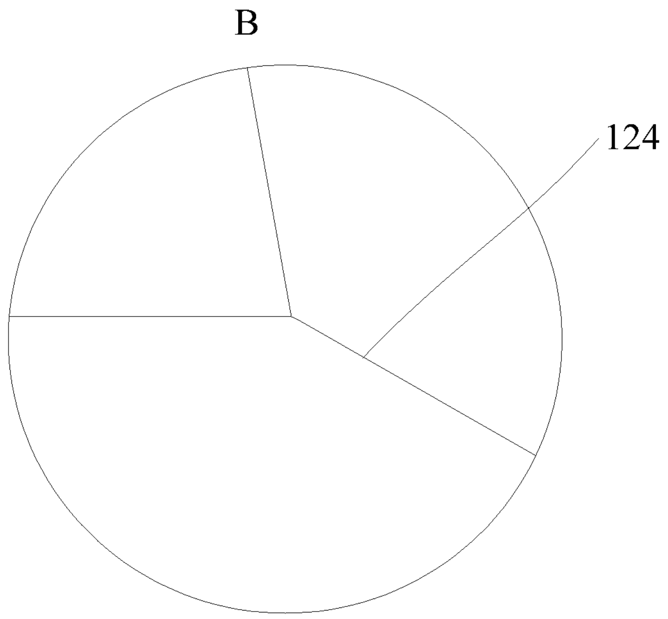
FIG. 12 is a partial enlarged view of portion B in FIG. 11.

Further, as shown in FIG. 10, a first center line 150 of a slot opening of the stator slot 122 corresponding to the sunken portion 130 is located on one side of a second center line 160 of the stator slot 122 corresponding to the sunken portion 130.

Figure 13:
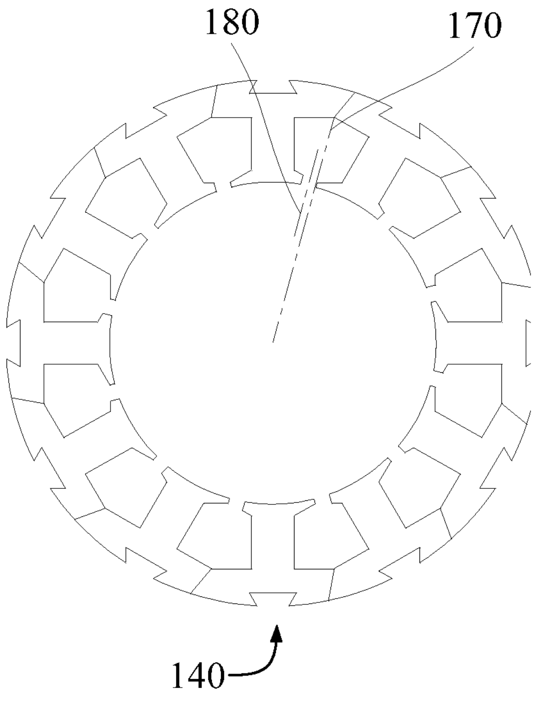
FIG. 13 shows a schematic structural diagram from a second viewing angle of a main portion according to an embodiment of the present disclosure.
Figure 14:
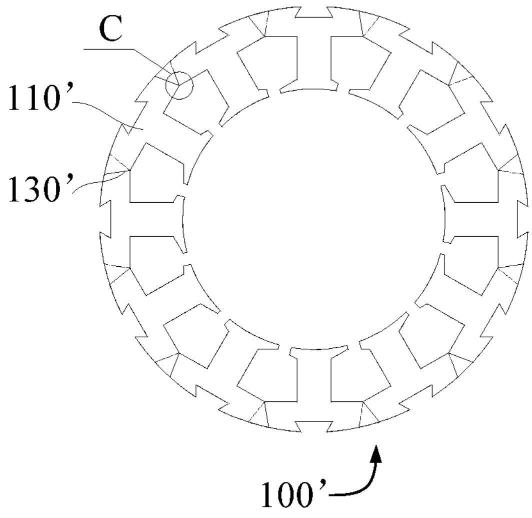
FIG. 14 shows a schematic structural diagram of a stator core in the related art.
Figure 15:
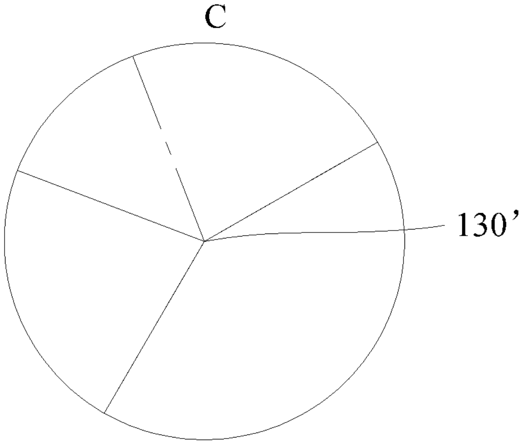
FIG. 15 is a partial enlarged view of portion C in FIG. 14.
Figure 16:
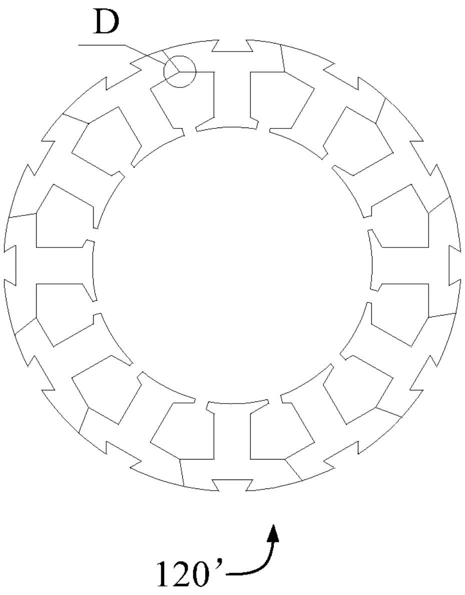
FIG. 16 shows a schematic structural diagram of a lamination in the related art.
Figure 17:
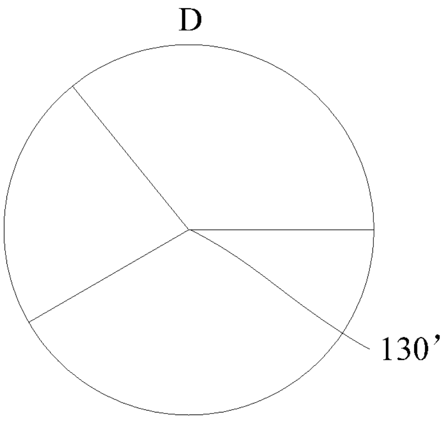
FIG. 17 is a partial enlarged view of portion D in FIG. 16.

As shown in FIG. 13, a third center line 170 of a slot opening of the stator slot 122 corresponding to the main portion 140 is located on one side of a fourth center line 180 of the stator slot 122 corresponding to the main portion 140.

In this embodiment, a center line of the slot opening of the stator slot 122 corresponding to the sunken portion 130 is recorded as the first center line 150, a center line of the stator slot 122 corresponding to the sunken portion 130 is recorded as the second center line 160, and the first center line 150 is located on one side of the second center line 160. In this way, reluctance torque caused by asymmetry of a rotor magnetic circuit structure is fully used. When the electric motor works, a rotor inside the stator core 100 rotates to improve the reluctance torque of the electric motor, and torque and a torque coefficient of the electric motor are improved without changing a back electromotive force coefficient, and it is ensured that the electric motor has great torque output capability during rotation.

A center line of the slot opening of the stator slot 122 corresponding to the main portion 140 is recorded as the third center line 170, a center line of the stator slot 122 corresponding to the main portion 140 is recorded as the fourth center line 180, and the third center line 170 is located on one side of the fourth center line 180. In this way, reluctance torque caused by asymmetry of a rotor magnetic circuit structure is fully used. When the electric motor works, a rotor inside the stator core 100 rotates to improve the reluctance torque of the electric motor, and torque and a torque coefficient of the electric motor are improved without changing a back electromotive force coefficient, and it is ensured that the electric motor has great torque output capability during rotation. The electric motor is a unidirectional rotating motor.

Further, the first center line 150 is parallel to the second center line 160; and the third center line 170 is parallel to the fourth center line 180.

The first center line 150 is parallel to the second center line 160, that is, the first center line 150 and the second center line 160 are parallel to each other and do not coincide with each other. The third center line 170 is parallel to the fourth center line 180, that is, the third center line 170 and the fourth center line 180 are parallel to each other and do not coincide with each other.

In the embodiment, the block core 110 is sectioned in the direction perpendicular to the axial direction of the stator core 100. In the section, a connecting line between the joint of the spliced surfaces 124 of the two adjacent stator yokes 112 and a center of the stator core 100 is a center line of the stator slot 122.

As shown in FIGS. 1-5, 8, 11 and 12, a stator core 100 is provided according to another embodiment. The stator core 100 includes a plurality of block cores 110. The plurality of block cores 110 are sequentially connected end to end along an axis of the stator core 100, and each of the block cores 110 includes a plurality of laminations stacked.

Each of the block cores 110 includes a stator yoke 112 and a stator tooth 114 that are connected to each other. The stator tooth 114 is located between the stator yoke 112 and the axis of the stator core 100. The stator yokes 112 and the stator teeth 114 of any two adjacent block cores 110 define a stator slot 122.

A wall surface, facing the axis of the stator core 100, of the stator yoke 112 is a spliced surface 124. Along a circumferential direction of the stator core 100, there is a smooth transition in at least part of a joint of spliced surfaces 124 of any two adjacent stator yokes 112.

The block core 110 includes a sunken portion 130 and a main portion 140 that are stacked. The sunken portion 130 and the main portion 140 are stacked in an axial direction of the stator core 100. The stator core 100 is sectioned in the direction perpendicular to the axial direction of the stator core 100, and the stator slot 122 corresponding to the sunken portion 130 has a greater sectional area than the stator slot 122 corresponding to the main portion 140.

A first center line 150 of a slot opening of the stator slot 122 corresponding to the sunken portion 130 is located on one side of a second center line 160 of the stator slot 122 corresponding to the sunken portion 130.

Further, the first center line 150 is located on one side of the third center line 170.

In the circumferential direction of the stator core 100, the slot opening of the stator slot 122 corresponding to the sunken portion 130 has a greater width than the slot opening of the stator slot 122 corresponding to the main portion 140.

In this embodiment, a structure of the stator core 100 is reasonably arranged, and in the circumferential direction of the stator core 100, the slot opening of the stator slot 122 corresponding to the sunken portion 130 has a greater width than the slot opening of the stator slot 122 corresponding to the main portion 140. Through the arrangement, torque and a torque coefficient of the electric motor can be improved, it can be ensured that the electric motor has great torque output capability during rotation, and further machining difficulty of the stator core 100 can be reduced. The stator core is convenient to machine and can be produced massively, and production cost of products can be reduced.

As shown in FIGS. 1-5, 8, 11 and 12, a stator core 100 is provided according to another embodiment. The stator core 100 includes a plurality of block cores 110. The plurality of block cores 110 are sequentially connected end to end along an axis of the stator core 100, and each of the block cores 110 includes a plurality of laminations stacked.

Each of the block cores 110 includes a stator yoke 112 and a stator tooth 114 that are connected to each other. The stator tooth 114 is located between the stator yoke 112 and the axis of the stator core 100. The stator yokes 112 and the stator teeth 114 of any two adjacent block cores 110 define a stator slot 122.

A wall surface, facing the axis of the stator core 100, of the stator yoke 112 is a spliced surface 124. Along a circumferential direction of the stator core 100, there is a smooth transition in at least part of a joint of spliced surfaces 124 of any two adjacent stator yokes 112.

The block core 110 includes a sunken portion 130 and a main portion 140 that are stacked. The sunken portion 130 and the main portion 140 are stacked in an axial direction of the stator core 100. The stator core 100 is sectioned in the direction perpendicular to the axial direction of the stator core 100, and the stator slot 122 corresponding to the sunken portion 130 has a greater sectional area than the stator slot 122 corresponding to the main portion 140.

Further, as shown in FIGS. 1, 2, 3, 4 and 5, the stator tooth 114 includes a tooth body 116 and a tooth crown. The tooth crown includes a first pole shoe 118 and a second pole shoe 120.

The tooth body 116 is connected to the stator yoke 112. The tooth crown is connected to one end, facing away from the stator yoke 112, of the tooth body 116. The first pole shoe 118 and the second pole shoe 120 are located on two sides of the tooth body 116 in the circumferential direction of the stator core 100. An end surface, facing away from the tooth body 116, of the first pole shoe 118 corresponding to the sunken portion 130 is coplanar with an end surface, facing away from the tooth body 116, of the first pole shoe 118 corresponding to the main portion 140.

An end surface, facing away from the tooth body 116, of the second pole shoe 120 corresponding to the sunken portion 130 is located on an inner side of an end surface, facing away from the tooth body 116, of the second pole shoe 120 corresponding to the main portion 140.

The stator tooth 114 includes the tooth body 116 and the tooth crown. The tooth crown includes the first pole shoe 118 and the second pole shoe 120. The first pole shoe 118 and the second pole shoe 120 are located on the two sides of the tooth body 116 in the circumferential direction of the stator core 100. That is, the slot opening of the stator slot 122 is defined between the first pole shoes 118 and the second pole shoes 120 of the two adjacent block cores 110.

The end surface, facing away from the tooth body 116, of the first pole shoe 118 corresponding to the sunken portion 130 is coplanar with the end surface, facing away from the tooth body 116, of the first pole shoe 118 corresponding to the main portion 140. The end surface, facing away from the tooth body 116, of the second pole shoe 120 corresponding to the sunken portion 130 is located on the inner side of the end surface, facing away from the tooth body 116, of the second pole shoe 120 corresponding to the main portion 140.

Through the arrangement, it is feasible to machine the stator core 100, machining difficulty of the stator core 100 can be reduced, the stator core is convenient to machine and can be produced massively, and production cost of products can be reduced.

In this embodiment, in the circumferential direction of the stator core 100, the corresponding center line of a part between the first pole shoes 118 and the second pole shoes 120 of the two adjacent block cores 110 is the center line of the slot opening of the stator slot 122.

As shown in FIGS. 1-5, 8, 11 and 12, on the basis of any one of the above embodiments, a stator core 100 is provided according yet another embodiment. The stator core 100 includes a plurality of block cores 110. The plurality of block cores 110 are sequentially connected end to end along an axis of the stator core 100, and each of the block cores 110 includes a plurality of laminations stacked.

Each of the block cores 110 includes a stator yoke 112 and a stator tooth 114 that are connected to each other. The stator tooth 114 is located between the stator yoke 112 and the axis of the stator core 100. The stator yokes 112 and the stator teeth 114 of any two adjacent block cores 110 define a stator slot 122.

A wall surface, facing the axis of the stator core 100, of the stator yoke 112 is a spliced surface 124. Along a circumferential direction of the stator core 100, there is a smooth transition in at least part of a joint of spliced surfaces 124 of any two adjacent stator yokes 112.

Figure 6:
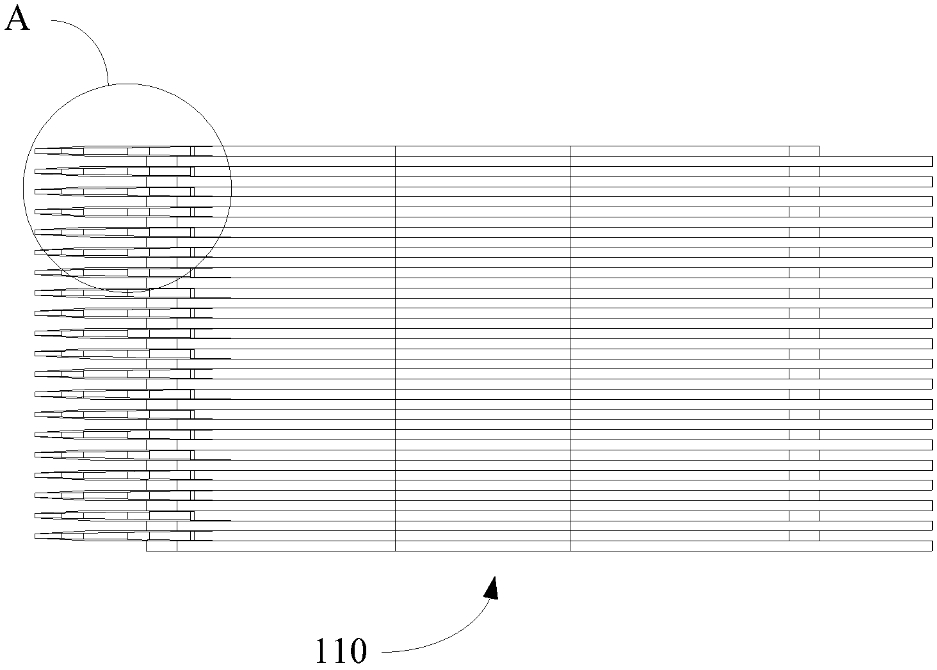
FIG. 6 shows a schematic structural diagram from a third viewing angle of a block core according to an embodiment of the present disclosure.
Figure 7:
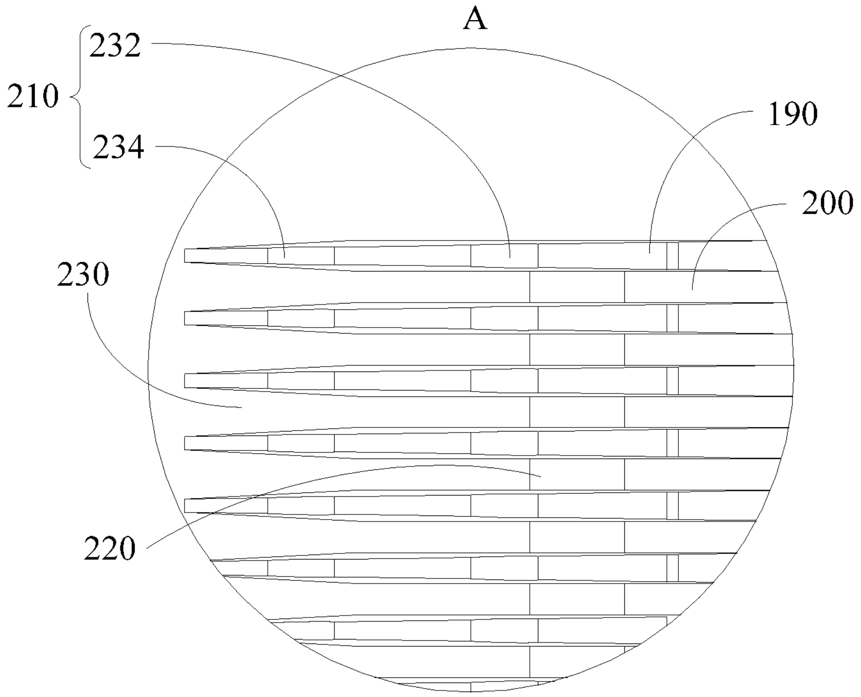
FIG. 7 is a partial enlarged view of portion A in FIG. 6.
Figure 8:
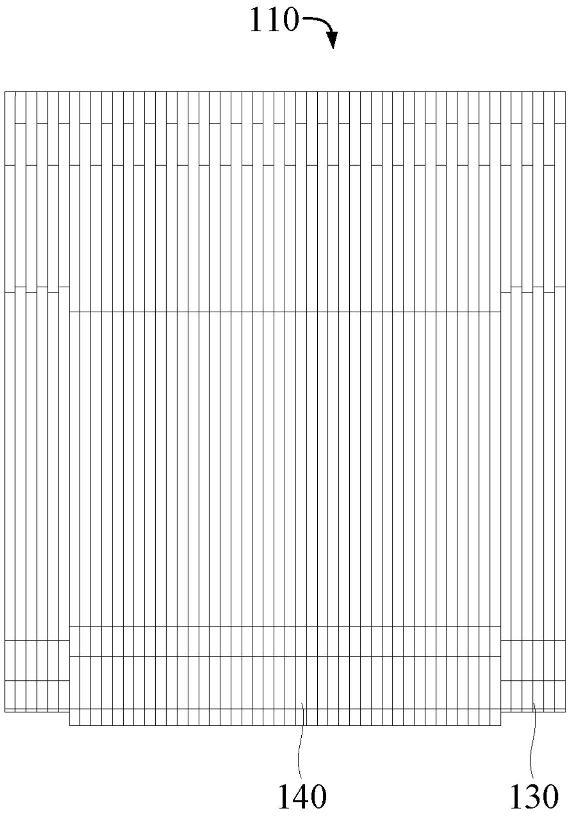
FIG. 8 shows a schematic structural diagram from a fourth viewing angle of a block core according to an embodiment of the present disclosure.
Figure 9:
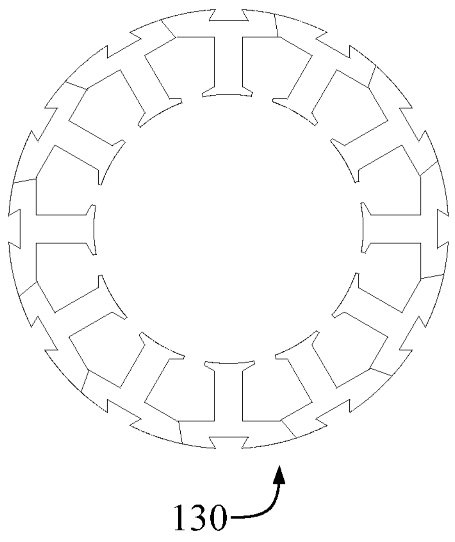
FIG. 9 shows a schematic structural diagram from a first viewing angle of a sunken portion according to an embodiment of the present disclosure.

Further, as shown in FIGS. 6 and 7, a plurality of laminations of each of the block cores 110 include: a plurality of first lamination layers 190 and a plurality of second lamination layers 200. In an axial direction of the stator core 100, a second lamination layer 200 is sandwiched between any two adjacent first lamination layers 190.

The first lamination layer 190 includes at least one first lamination, and the second lamination layer 200 includes at least one second lamination.

In the circumferential direction of the stator core 100, first sides of the first lamination layers 190 are provided with overlapping portions 210, second sides of the first lamination layers 190 are provided with notch portions 220; and first sides of the second lamination layers 200 are provided with notch portions 220, and second sides of the second lamination layers 200 are provided with overlapping portions 210.

In the axial direction of the stator core 100, the two adjacent overlapping portions 210 are located on two sides of the notch portion 220 and define an overlapping gap 230.

When the two adjacent block cores 110 are connected to each other in a matched manner, an overlapping portion 210 of one of the block cores 110 is capable of being inserted into an overlapping gap 230 of the other block core 110, and a height of part, inserted into the overlapping gap 230 first in a circle forming process, of the overlapping portion 210 is smaller than a distance between the overlapping gaps 230.

In this embodiment, the block core 110 includes the plurality of first lamination layers 190 and the plurality of second lamination layers 200, and a second lamination layer 200 is sandwiched between any two adjacent first lamination layers 190. The first lamination layer 190 has a fracture, and the first lamination layer 190 is provided with the overlapping portion 210 on a first side of the fracture and the notch portion 220 on a second side of the fracture. The second lamination layer 200 has a fracture, and the second lamination layer 200 is provided with the notch portion 220 on a first side of the fracture and the overlapping portion 210 on a second side of the fracture.

In this way, in the axial direction of the stator core 100, a second lamination layer 200 is sandwiched between any two adjacent first lamination layers 190, an interval exists between the overlapping portions 210 of the two adjacent first lamination layers 190 at the first side of the fracture, and the overlapping gap 230 of the first side of the fracture is directly defined at the notch portion 220 of the second lamination layer 200 between the two first lamination layers 190. Accordingly, an interval exists between the overlapping portions 210 of the two adjacent second lamination layers 200 at the second side of the fracture, and the overlapping gap 230 of the first side of the fracture is directly defined at the notch portion 220 of the first lamination layer 190 between the two second lamination layers 200.

It may be understood that the stator core 100 is provided with a fracture, and the stator core 100 may be disconnected and formed into a circle at the fracture. In the embodiment, when the stator core 100 is in a disconnected state, the winding may be wound around the stator tooth 114. In this case, the stator core 100 is in the disconnected state, and it is ensured that the stator slot 122 has a large enough space, which facilitates winding of the winding and further facilitates corresponding insulation treatment. After winding, the stator core 100 may be spliced and formed into a circle.

Especially, when the stator core 100 is in the disconnected state, the stator core 100 is provided with the overlapping gap 230 on the first side of the fracture in the circumferential direction, and the stator core 100 is provided with the overlapping portion 210 on the second side of the fracture in the circumferential direction. When the two adjacent block cores 110 are connected in a matched manner, the overlapping portion 210 of one of the block cores 110 may be inserted into the overlapping gap 230 of the other block core 110. That is, when the stator core 100 is to be spliced and formed into a circle, the overlapping portion 210 may be inserted into the overlapping gap 230, and further splicing and circle forming of the stator core 100 are completed.

In addition, in a splicing and circle forming process, an end of the overlapping portion 210 is first inserted into the overlapping gap 230. Therefore, the overlapping portion 210 is optimized, and a height of part, first inserted into the overlapping gap 230 in the circle forming process, of the overlapping portion 210 is designed to be smaller than the distance between the overlapping gaps 230. In this way, in the splicing and circle forming process, it is ensured that the end of the overlapping portion 210 can be successfully inserted into the overlapping gap 230 first and no interference and collision occur in a process of inserting the overlapping portion 210. Even by optimizing the height of the end of the overlapping portion 210, a tolerance of the overlapping portion 210 and the overlapping gap 230 and burrs and other defects generated in a process of manufacturing the overlapping portion 210 can be compensated for, working efficiency of splicing and circle forming is ensured, and further quality of the stator core 100 finally manufactured is ensured.

Therefore, the stator provided in the present disclosure optimizes the height of the end of the overlapping portion 210, and the height of the part, first inserted into the overlapping gap 230 in the circle forming process, of the overlapping portion 210 is smaller than the distance between the overlapping gaps 230, and it is ensured that the end of the overlapping portion 210 can be successfully inserted into the overlapping gap 230 in the splicing and circle forming process, and further the problem that splicing is conducted unsuccessfully due to defects such as manufacturing errors or burrs in the related art is solved.

In an embodiment, the above notch portion 220 may be formed through cutting. That is, the notch portion 220 may be formed by cutting off part of a material from the second side of the first lamination layer 190, and the notch portion 220 may be formed by cutting off part of a material from the first side of the second lamination layer 200.

In an embodiment, when the first lamination layer 190 includes a plurality of first laminations, the plurality of first laminations are stacked in the axial direction of the stator core 100. When the second lamination layer 200 includes a plurality of second laminations, the plurality of second laminations are stacked in the axial direction of the stator core 100.

In an embodiment, the sunken portion 130 includes a plurality of first lamination layers 190 and a plurality of second lamination layers 200. The main portion 140 includes a plurality of first lamination layers 190 and a plurality of second lamination layers 200.

Further, as shown in FIG. 7, the overlapping portion 210 includes an insertion portion 232 and a guide portion 234.

The insertion portion 232 is inserted into the overlapping gap 230. The guide portion 234 is arranged on the insertion portion 232 and inserted first into the overlapping gap 230 in the circle forming process. The guide portion 234 has a smaller height than the insertion portion 232, where the overlapping portion 210 includes the insertion portion 232 and the guide portion 234. The guide portion 234 is arranged on the insertion portion 232 and inserted first into the overlapping gap 230 in the circle forming process. Therefore, the present disclosure optimizes the height of the guide portion 234 and ensures that the guide portion 234 has a smaller height than the insertion portion 232, and the overlapping portion 210 can be optimized to be a structure having thinner edges and a thicker middle portion, it is ensured that the guide portion 234 can play a good guiding role in the splicing and circle forming process, and it is ensured that the guide portion 234 and the insertion portion 232 can be successfully inserted into the overlapping gap 230.

In addition, the height of the guide portion 234 is designed to be smaller than the distance between the overlapping gaps 230, and the height of the insertion portion 232 is designed to match the distance between the overlapping gaps 230, and on one hand, it is ensured that the guide portion 234 can be successfully inserted into the overlapping gap 230, and on the other hand, it is ensured that the insertion portion 232 is in contact with an inner wall of the overlapping gap 230 after splicing and circle forming, to ensure friction between the insertion portion and the overlapping gap and further facilitate subsequent welding treatment. In one embodiment, an inner diameter and an outer diameter of the stator core 100 are ensured to be accurate after splicing and circle forming, and a circular degree of the inner diameter and the outer diameter of the stator core 100 is ensured to be accurate, and iron loss of the electric motor using the stator is greatly reduced, and performance of the stator and the electric motor is improved.

As shown in FIGS. 1-5, 8, 11 and 12, a stator core 100 is provided according to another embodiment. The stator core 100 includes a plurality of block cores 110. The plurality of block cores 110 are sequentially connected end to end around an axis of the stator core 100, and each of the block cores 110 includes a plurality of laminations stacked.

Each of the block cores 110 includes a stator yoke 112 and a stator tooth 114 that are connected to each other. The stator tooth 114 is located between the stator yoke 112 and the axis of the stator core 100. The stator yokes 112 and the stator teeth 114 of any two adjacent block cores 110 define a stator slot 122.

A wall surface, facing the axis of the stator core 100, of the stator yoke 112 is a spliced surface 124. Along a circumferential direction of the stator core 100, there is a smooth transition in at least part of a joint of spliced surfaces 124 of any two adjacent stator yokes 112.

The block core 110 includes: a plurality of first lamination layers 190 and a plurality of second lamination layers 200. In the axial direction of the stator core 100, a second lamination layer 200 is sandwiched between any two adjacent first lamination layers 190.

The first lamination layer 190 includes at least one first lamination, and the second lamination layer 200 includes at least one second lamination.

In the circumferential direction of the stator core 100, first sides of the first lamination layers 190 are provided with overlapping portions 210, second sides of the first lamination layers 190 are provided with notch portions 220; and first sides of the second lamination layers 200 are provided with notch portions 220, and second sides of the second lamination layers 200 are provided with overlapping portions 210.

In the axial direction of the stator core 100, the two adjacent overlapping portions 210 are located on two sides of the notch portion 220 and define an overlapping gap 230.

When the two adjacent block cores 110 are connected to each other in a matched manner, an overlapping portion 210 of one of the block cores 110 is capable of being inserted into an overlapping gap 230 of the other block core 110, and a height of part, inserted into the overlapping gap 230 first in a circle forming process, of the overlapping portion 210 is smaller than a distance between the overlapping gaps 230.

Further, as shown in FIG. 6, in the axial direction of the stator core 100, projections of end surfaces, facing away from notch portions 220, of overlapping portions 210 of the plurality of second lamination layers 200 on a first plane coincide with one another. In the axial direction of the stator core 100, projections of end surfaces, facing away from notch portions 220, of overlapping portions 210 of the plurality of first lamination layers 190 on the first plane coincide with one another. The first plane is a plane perpendicular to the axis of the stator core 100.

In this embodiment, in the axial direction of the stator core 100, the projections of the end surfaces, facing away from the notch portions 220, of the overlapping portions 210 of the plurality of second lamination layers 200 on the first plane coincide with one another, and the projections of the end surfaces, facing away from the notch portions 220, of the overlapping portions 210 of the plurality of first lamination layers 190 on the first plane coincide with one another. Through the arrangement, after the stator core 100 is formed into a circle, in the axial direction of the stator core 100, projections of the fractures of the plurality of first lamination layers 190 on the first plane coincide with projections of the fractures of the plurality of second lamination layers 200 on the first plane. Through the arrangement, machining is facilitated, mass production is feasible, and production cost of products is reduced under the condition of ensuring performance of the stator core 100.

In some other embodiments, in the axial direction of the stator core 100, projections of end points, facing the axis of the stator core 100, of the overlapping portions 210 of the plurality of second lamination layers 200 on a second plane coincide with one another. In the axial direction of the stator core 100, projections of end points, facing the axis of the stator core 100, of the overlapping portions 210 of the plurality of first lamination layers 190 on the second plane coincide with one another. The second plane is a plane perpendicular to the axis of the stator core 100.

In the axial direction of the stator core 100, the projections of the end points, facing the axis of the stator core 100, of the overlapping portions 210 of the plurality of second lamination layers 200 on the second plane coincide with one another, and the projections of the end points, facing the axis of the stator core 100, of the overlapping portions 210 of the plurality of first lamination layers 190 on the second plane coincide with one another. After the stator core 100 is formed into a circle, in the axial direction of the stator core 100, projections of end points, facing the stator core 100, of the fractures of the plurality of first lamination layers 190 on the second plane coincide with projections of end points, facing the stator core 100, of the fractures of the plurality of second lamination layers 200 on the second plane. Through the arrangement, along the circumferential direction of the stator core 100, there is a smooth transition in the joint of the spliced surfaces 124 of any two adjacent stator yokes 112, which provides stable and reliable structural support.

As shown in FIGS. 1-5, 8, 11 and 12, a stator core 100 is provided. The stator core 100 includes a plurality of block cores 110. The plurality of block cores 110 are sequentially connected end to end along an axis of the stator core 100, and each of the block cores 110 includes a plurality of laminations stacked.

As shown in FIGS. 1-5, each of the block cores 110 includes a stator yoke 112 and a stator tooth 114 that are connected to each other. The stator tooth 114 is located between the stator yoke 112 and the axis of the stator core 100. The stator yokes 112 and the stator teeth 114 of any two adjacent block cores 110 define a stator slot 122.

As shown in FIGS. 1-5, a wall surface, facing the axis of the stator core 100, of the stator yoke 112 is a spliced surface 124. Along a circumferential direction of the stator core 100, there is a smooth transition in at least part of a joint of any two adjacent spliced surfaces 124.

At least part of the spliced surface 124 is a curved surface, and there is a smooth transition in the spliced surfaces 124 of the two adjacent stator yokes 112 by the curved surfaces.

The curved surface is an arc surface. The stator core 100 is sectioned in a direction perpendicular to an axial direction of the stator core 100, and a radius corresponding to an outline of the arc surface in a section is smaller than a thickness of a lamination.

As shown in FIGS. 1-5, the block core 110 includes a sunken portion 130 and a main portion 140 that are stacked. The sunken portion 130 and the main portion 140 are stacked in the axial direction of the stator core 100, and there is a smooth transition in a joint of the spliced surfaces corresponding to any two adjacent main portions 140 in the circumferential direction of the stator core 100. The stator core 100 is sectioned in the direction perpendicular to the axial direction of the stator core 100, and the stator slot 122 corresponding to the sunken portion 130 has a greater sectional area than the stator slot 122 corresponding to the main portion 140.

The slot wall of the stator slot 122 corresponding to the sunken portion 130 is located on an outer side of the slot wall of the stator slot 122 corresponding to the main portion 140.

As shown in FIGS. 1-5, the number of the sunken portions 130 is two, and the two sunken portions 130 are stacked on two sides of the main portion 140, respectively.

As shown in FIG. 10, a first center line 150 of a slot opening of the stator slot 122 corresponding to the sunken portion 130 is located on one side of a second center line 160 of the stator slot 122 corresponding to the sunken portion 130.

As shown in FIG. 13, a third center line 170 of a slot opening of the stator slot 122 corresponding to the main portion 140 is located on one side of a fourth center line 180 of the stator slot 122 corresponding to the main portion 140.

The first center line 150 is parallel to the second center line 160; and the third center line 170 is parallel to the fourth center line 180.

The first center line 150 is located on one side of the third center line 170.

As shown in FIGS. 1-5, the stator tooth 114 includes a tooth body 116 and a tooth crown. The tooth crown includes a first pole shoe 118 and a second pole shoe 120.

As shown in FIGS. 6 and 7, a plurality of laminations of each of the block cores 110 include: a plurality of first lamination layers 190 and a plurality of second lamination layers 200. In the axial direction of the stator core 100, a second lamination layer 200 is sandwiched between any two adjacent first lamination layers 190.

As shown in FIG. 7, the overlapping portion 210 includes an insertion portion 232 and a guide portion 234.

In the axial direction of the stator core 100, projections of end surfaces, facing away from notch portions 220, of overlapping portions 210 of the plurality of second lamination layers 200 on a first plane coincide with one another. In the axial direction of the stator core 100, projections of end surfaces, facing away from notch portions 220, of overlapping portions 210 of the plurality of first lamination layers 190 on the first plane coincide with one another. The first plane is a plane perpendicular to the axis of the stator core 100.

An embodiment of a second aspect of the present disclosure provides an electric motor. The electric motor includes the stator core 100 according to any one of the embodiments in the first aspect.

The electric motor provided in the present disclosure includes the stator core 100.

As shown in FIGS. 1-5, the stator core 100 includes a plurality of block cores 110, and the plurality of block cores 110 are sequentially connected end to end along an axis of the stator core 100, to constitute a cylindrical structure.

Each of the block cores 110 includes the stator yoke 112 and the stator tooth 114 that are connected to each other, and the stator yokes 112 and the stator teeth 114 of any two adjacent block cores 110 define the stator slot 122. The wall surface, facing the axis of the stator core 100, of the stator yoke 112 is the spliced surface 124.

In the related art, a wall surface, facing an axis of a stator core 100', of a block core 110' is an oblique surface. In this way, a joint of two adjacent stator yokes forms a sharp angle, and a size of the joint of the two adjacent stator yokes in a radial direction of the stator core 100' is reduced, which affects performance of an electric motor.

According to the present disclosure, a structure of the block cores 110 is reasonably arranged, and there is a smooth transition in at least part of the joint of spliced surfaces 124 of any two adjacent stator yokes 112 along the circumferential direction of the stator core 100. Through the arrangement, a size of the joint of the two adjacent stator yokes 112 is increased advantageously in the radial direction of the stator core 100, the situation that performance of the electric motor is affected due to too small a size of the joint of the two adjacent stator yokes 112 is avoided, and running stability and working efficiency of the electric motor can be ensured.

Further, along the circumferential direction of the stator core 100, there is a smooth transition in at least part of the joint of the spliced surfaces 124 of any two adjacent stator yokes 112. In this way, the situation that burrs are generated at the joint of the two adjacent stator yokes 112 due to machining errors and assembly errors and are likely to puncture slot insulation paper in the stator core 100 can be avoided, an insulation effect of the slot insulation paper can be ensured, and stable and reliable structural support is provided for ensuring performance of the electric motor. The structure has advantages of a simple machining technology, convenient operation and low production cost.

Further, along the circumferential direction of the stator core 100, there is a smooth transition in at least part of the joint of the spliced surfaces 124 of any two adjacent stator yokes 112. When a winding reel is used for winding, no interference in the winding reel is generated, and the winding reel may be attached to a slot bottom of the stator slot 122. Further, a matching size of a winding and the stator core 100 after winding is ensured, and effective structural support is provided for stability and efficiency of running of the electric motor.

In addition, the electric motor further includes a rotor. The rotor is arranged inside the stator and may cooperate with the stator to rotate and further output torque.

An embodiment of a third aspect of the present disclosure provides a compressor. The compressor includes the electric motor according to the second aspect.

The compressor provided in the present disclosure includes the electric motor. The electric motor includes a stator core 100.

As shown in FIGS. 1-5, the stator core 100 includes a plurality of block cores 110, and the plurality of block cores 110 are sequentially connected end to end along an axis of the stator core 100, to constitute a cylindrical structure.

Each of the block cores 110 includes the stator yoke 112 and the stator tooth 114 that are connected to each other, and the stator yokes 112 and the stator teeth 114 of any two adjacent block cores 110 define the stator slot 122. The wall surface, facing the axis of the stator core 100, of the stator yoke 112 is the spliced surface 124.

In the related art, a wall surface, facing an axis of a stator core 100', of a block core 110' is an oblique surface. In this way, a joint of two adjacent stator yokes forms a sharp angle, and a size of the joint of the two adjacent stator yokes in a radial direction of the stator core 100' is reduced, which affects performance of an electric motor.

According to the present disclosure, a structure of the block cores 110 is reasonably arranged, and there is a smooth transition in at least part of the joint of spliced surfaces 124 of any two adjacent stator yokes 112 along the circumferential direction of the stator core 100. Through the arrangement, a size of the joint of the two adjacent stator yokes 112 is increased advantageously in the radial direction of the stator core 100, the situation that performance of the electric motor is affected due to too small a size of the joint of the two adjacent stator yokes 112 is avoided, and running stability and working efficiency of the electric motor can be ensured.

Further, along the circumferential direction of the stator core 100, there is a smooth transition in at least part of the joint of the spliced surfaces 124 of any two adjacent stator yokes 112. In this way, the situation that burrs are generated at the joint of the two adjacent stator yokes 112 due to machining errors and assembly errors and are likely to puncture slot insulation paper in the stator core 100 can be avoided, an insulation effect of the slot insulation paper can be ensured, and stable and reliable structural support is provided for ensuring performance of the electric motor. The structure has advantages of a simple machining technology, convenient operation and low production cost.

Further, along the circumferential direction of the stator core 100, there is a smooth transition in at least part of the joint of the spliced surfaces 124 of any two adjacent stator yokes 112. When a winding reel is used for winding, the joint of the two adjacent stator yokes 112 cannot interfere with the winding reel, and the winding reel may be attached to a slot bottom of the stator slot 122. Further, a matching size of a winding and the stator core 100 after winding is ensured, and effective structural support is provided for stability and efficiency of running of the electric motor.

An embodiment of a fourth aspect of the present disclosure provides a vehicle. The vehicle includes: the compressor according to the third aspect.

The vehicle provided in the present disclosure includes the compressor. The compressor includes an electric motor. The electric motor includes a stator core 100.

As shown in FIGS. 1-5, the stator core 100 includes a plurality of block cores 110, and the plurality of block cores 110 are sequentially connected end to end along an axis of the stator core 100, to constitute a cylindrical structure.

Each of the block cores 110 includes the stator yoke 112 and the stator tooth 114 that are connected to each other, and the stator yokes 112 and the stator teeth 114 of any two adjacent block cores 110 define the stator slot 122. The wall surface, facing the axis of the stator core 100, of the stator yoke 112 is the spliced surface 124.

In the related art, a wall surface, facing an axis of a stator core 100', of a block core 110' is an oblique surface. In this way, a joint of two adjacent stator yokes forms a sharp angle, and a size of the joint of the two adjacent stator yokes in a radial direction of the stator core 100' is reduced, which affects performance of an electric motor.

According to the present disclosure, a structure of the block cores 110 is reasonably arranged, and there is a smooth transition in at least part of the joint of spliced surfaces 124 of any two adjacent stator yokes 112 along the circumferential direction of the stator core 100. Through the arrangement, a size of the joint of the two adjacent stator yokes 112 is increased advantageously in the radial direction of the stator core 100, the situation that performance of the electric motor is affected due to too small a size of the joint of the two adjacent stator yokes 112 is avoided, and running stability and working efficiency of the electric motor can be ensured.

Further, along the circumferential direction of the stator core 100, there is a smooth transition in at least part of the joint of the spliced surfaces 124 of any two adjacent stator yokes 112. In this way, the situation that burrs are generated at the joint of the two adjacent stator yokes 112 due to machining errors and assembly errors and are likely to puncture slot insulation paper in the stator core 100 can be avoided, an insulation effect of the slot insulation paper can be ensured, and stable and reliable structural support is provided for ensuring performance of the electric motor. The structure has advantages of a simple machining technology, convenient operation and low production cost.

Further, along the circumferential direction of the stator core 100, there is a smooth transition in at least part of the joint of the spliced surfaces 124 of any two adjacent stator yokes 112. When a winding reel is used for winding, the joint of the two adjacent stator yokes 112 cannot interfere with the winding reel, and the winding reel may be attached to a slot bottom of the stator slot 122. Further, a matching size of a winding and the stator core 100 after winding is ensured, and effective structural support is provided for stability and efficiency of running of the electric motor.

In the present disclosure, "a plurality of" means two or more, unless expressly specified otherwise. The terms "mount", "connection", "connected", "fix", etc. are to be construed broadly. For instance, the term "connected" can denote fixed connection, or detachable connection, or integral connection. The term "connection" can denote direct connection, or indirect connection through an intermediary medium. For those of ordinary skill in the art, the specific meanings of the above terms in the present disclosure can be understood according to specific circumstances.

In the description, the terms "an embodiment", "some embodiments", "specific embodiment", etc. indicate that specific features, structures, materials or characteristics described in conjunction with the embodiment or instances are included in at least one embodiment or instance of the present disclosure. In the description, the schematic descriptions of the above terms do not necessarily refer to the same embodiment or instance. Moreover, the specific features, structures, materials or characteristics described can be combined in a suitable way in any one or more embodiments or instances.

What is described above is merely illustrative of some embodiments of the present disclosure and is not intended to limit the present disclosure, and various changes and modifications can be made by those skilled in the art. Any modifications, equivalent substitutions, improvements, etc. made within the spirit and principle of the present disclosure should fall within the scope of protection of the present disclosure.

What is claimed is:

1. A stator core comprising:

a plurality of block cores, wherein:

the plurality of block cores are sequentially connected end to end along an axis of the stator core, and each of the block cores comprises a plurality of laminations that are stacked;

each of the block cores comprises a stator yoke and a stator tooth that are connected to each other, the stator tooth is located between the stator yoke and the axis of the stator core, and the stator yokes and the stator teeth of any two adjacent block cores define a stator slot, wherein the stator tooth comprises:

a tooth body connected to the stator yoke; and a tooth crown connected to one end, facing away from the stator yoke, of the tooth body, wherein the tooth crown comprises a first pole shoe and a second pole shoe, wherein the first pole shoe and the second pole shoe are located on two sides of the tooth body in the circumferential direction of the stator core, and wherein a projection of the tooth crown in a plane normal to an axial direction of the stator core is asymmetrical about a radial line bisecting the tooth body;

a wall surface, facing the axis of the stator core, of the stator yoke is a spliced surface; and along a circumferential direction of the stator core, a smooth transition is provided in at least part of a joint of any two adjacent spliced surfaces, wherein the plurality of laminations of each of the block cores comprises:

a plurality of first lamination layers and a plurality of second lamination layers, wherein in the axial direction of the stator core, one of the second lamination layers is sandwiched between any two adjacent first lamination layers, the first lamination layer comprises a single first lamination, and the second lamination layer comprises a single second lamination, wherein:

in the circumferential direction of the stator core, first sides of the first lamination layers are provided with overlapping portions, and second sides of the first lamination layers are provided with notch portions;

in the circumferential direction of the stator core, first sides of the second lamination layers are provided with the notch portions, and second sides of the second lamination layers are provided with the overlapping portions; and in the axial direction of the stator core, two adjacent overlapping portions are located on two sides of the notch portion and define an overlapping gap, wherein when the two adjacent block cores are connected to each other in a matched manner, an overlapping portion of one of the block cores is configured to be inserted into an overlapping gap of the other block core, and a height of part of the overlapping portion in a circle forming process is smaller than a distance between the overlapping gaps, wherein the part is inserted into the overlapping gap first, wherein the overlapping portion comprises:

an insertion portion inserted into the overlapping gap; and a guide portion arranged on the insertion portion and inserted first into the overlapping gap in a circle forming process, wherein the guide portion has a smaller height than the insertion portion.

2. The stator core according to claim 1, wherein:

at least part of the spliced surface comprises a curved surface, and the spliced surfaces of the two adjacent stator yokes are in smooth transition by the curved surfaces.

3. The stator core according to claim 2, wherein:

the curved surface comprises an arc surface; and the stator core is sectioned in a direction perpendicular to the axial direction of the stator core, and a radius corresponding to an outline of the arc surface in a section is smaller than a thickness of the lamination.

4. The stator core according to claim 1, wherein:

in the axial direction of the stator core, projections of end surfaces, facing away from the notch portions, of the overlapping portions of the plurality of second lamination layers on a first plane coincide;

in the axial direction of the stator core, projections of end surfaces, facing away from the notch portions, of the overlapping portions of the plurality of first lamination layers on the first plane coincide; and the first plane is a plane perpendicular to the axis of the stator core.

5. The stator core according to claim 1, wherein:

in the axial direction of the stator core, projections of end points, facing the axis of the stator core, of the overlapping portions of the plurality of second lamination layers on a second plane coincide;

in the axial direction of the stator core, projections of end points, facing the axis of the stator core, of the overlapping portions of the plurality of first lamination layers on the second plane coincide; and the second plane is a plane perpendicular to the axis of the stator core.

6. The stator core according to claim 1, wherein the block core comprises:

a sunken portion; and a main portion, wherein the sunken portion and the main portion are stacked in the axial direction of the stator core, and a joint of the spliced surfaces corresponding to any two adjacent main portions is in smooth transition in the circumferential direction of the stator core, wherein the stator core is sectioned in the direction perpendicular to the axial direction of the stator core, and the stator slot corresponding to the sunken portion has a greater sectional area than the stator slot corresponding to the main portion.

7. The stator core according to claim 6, wherein a slot wall of the stator slot corresponding to the sunken portion is located on an outer side of a slot wall of the stator slot corresponding to the main portion.

8. The stator core according to claim 6, wherein the number of the sunken portions is two, and the two sunken portions are stacked on two sides of the main portion, respectively.

9. The stator core according to claim 6, wherein:

a first center line of a slot opening of the stator slot corresponding to the sunken portion is located on one side of a second center line of the stator slot corresponding to the sunken portion; and a third center line of a slot opening of the stator slot corresponding to the main portion is located on one side of a fourth center line of the stator slot corresponding to the main portion.

10. The stator core according to claim 9, wherein:

the first center line is parallel to the second center line; and the third center line is parallel to the fourth center line.

11. The stator core according to claim 9, wherein:

the first center line is located on one side of the third center line; and in the circumferential direction of the stator core, the slot opening of the stator slot corresponding to the sunken portion has a greater width than the slot opening of the stator slot corresponding to the main portion.

12. The stator core according to claim 6, wherein:

an end surface, facing away from the tooth body, of the first pole shoe corresponding to the sunken portion is coplanar with an end surface, facing away from the tooth body, of the first pole shoe corresponding to the main portion; and an end surface, facing away from the tooth body, of the second pole shoe corresponding to the sunken portion is located on an inner side of an end surface, facing away from the tooth body, of the second pole shoe corresponding to the main portion.

13. An electric motor comprising the stator core according to claim 1.

14. A compressor comprising the electric motor according to claim 13.

15. A vehicle comprising the compressor according to claim 14.

16. A stator core comprising:

a plurality of block cores:

formed of alternating first lamination layers and second lamination layers comprising respective single plates;

forming respective stator yokes and stator teeth; and arranged around an axis of the stator core, wherein:

each stator tooth of the stator teeth comprises:

a tooth body connected to a respective stator yoke; and a tooth crown connected to one end of the tooth body facing away from the respective stator yoke and comprising a first pole shoe and a second pole shoe located on respective sides of the tooth body in a circumferential direction of the stator core, projections of the first pole shoe and the second pole shoe in a plane normal to an axial direction of the stator core being asymmetrical about a radial line bisecting the tooth body:

portions of the first lamination layers of each block core are interleaved with portions of the second lamination layers of an adjacent block core;

the portions of the first lamination layers are tapered in thickness away from other portions of the first lamination layers such that thicknesses of the first lamination layers away from the other portions of the first lamination layers are less than thicknesses of the first lamination layers towards the other portions of the first lamination layers; and the stator yokes and the stator teeth of any two adjacent block cores define a stator slot.

17. The stator core of claim 16, wherein:

the stator slots have respective sunken portions and main portions; and portions of the stator yokes corresponding to the sunken portions have surfaces that are further from the axis than portions of the stator yokes corresponding to the main portions.

18. The stator core of claim 16, wherein the projection of the second pole shoe is larger than the projection of the first pole shoe.

* * * * *